(12) United States Patent
Yamaguchi et al.

(10) Patent No.: US 6,240,252 B1
(45) Date of Patent: May 29, 2001

(54) CAMERA

(75) Inventors: Motoshi Yamaguchi, Sakai; Ichiro Tsujimura, Higashiosaka; Shigeto Ohmori, Kawachinagano; Tsutomu Ichikawa, Sakai; Hiroshi Ueda, Habikino; Tatsuya Suzuki, Kawachinagano; Akio Nakamaru, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/394,898

(22) Filed: Sep. 13, 1999

(30) Foreign Application Priority Data

Sep. 14, 1998 (JP) .................................................. 10-259866
Sep. 14, 1998 (JP) .................................................. 10-260130

(51) Int. Cl.[7] .................................................. G03B 15/05
(52) U.S. Cl. .......................... 396/61; 396/106; 396/123; 396/157; 396/159; 396/266
(58) Field of Search .............................. 396/61, 157, 159, 396/121, 122, 123, 106, 266, 48

(56) References Cited

U.S. PATENT DOCUMENTS

| | | | |
|---|---|---|---|
| 4,257,705 | * 3/1981 | Hosoe et al. | 396/106 |
| 5,175,579 | 12/1992 | Matsui et al. | 396/109 |
| 5,293,194 | * 3/1994 | Akashi | 396/106 |
| 5,311,243 | * 5/1994 | Tokunaga | 396/159 X |
| 5,815,743 | 9/1998 | Ohmori | 396/61 |
| 6,035,139 | * 3/2000 | Nakamura | 396/121 |

* cited by examiner

Primary Examiner—W. B. Perkey
(74) Attorney, Agent, or Firm—Burns, Doane, Swecker & Mathis, LLP

(57) ABSTRACT

A camera is provided with a distance measurement device having a plurality of distance measurement regions and outputting distance measurement information of each distance measurement region, a light adjustment device having a plurality of light adjustment regions including regions substantially coinciding with the distance measurement regions, and an auxiliary light emitting device for emitting auxiliary light in distance measurement. The auxiliary light emitting device emits auxiliary light when low contrast is detected in at least one of the plurality of distance measurement regions. When auxiliary light is emitted, the flash light emission quantity is controlled based on the distance measurement information in auxiliary light emission and an output from the light adjustment device.

22 Claims, 28 Drawing Sheets

FIG. 9
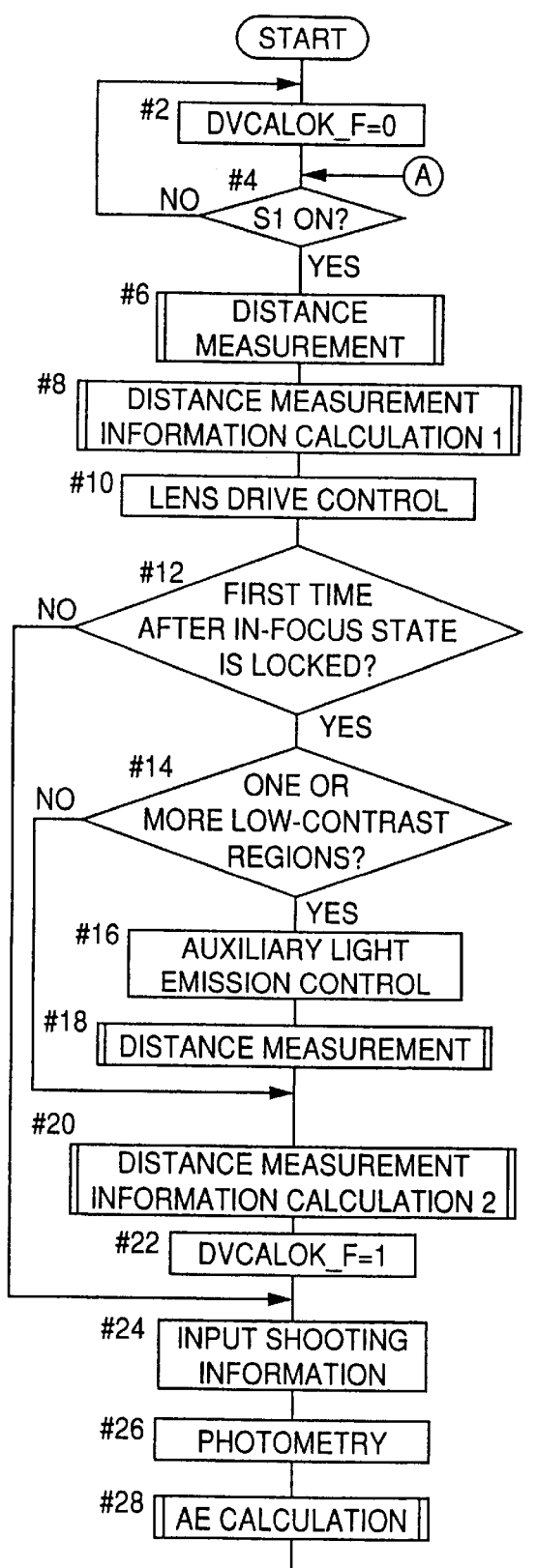
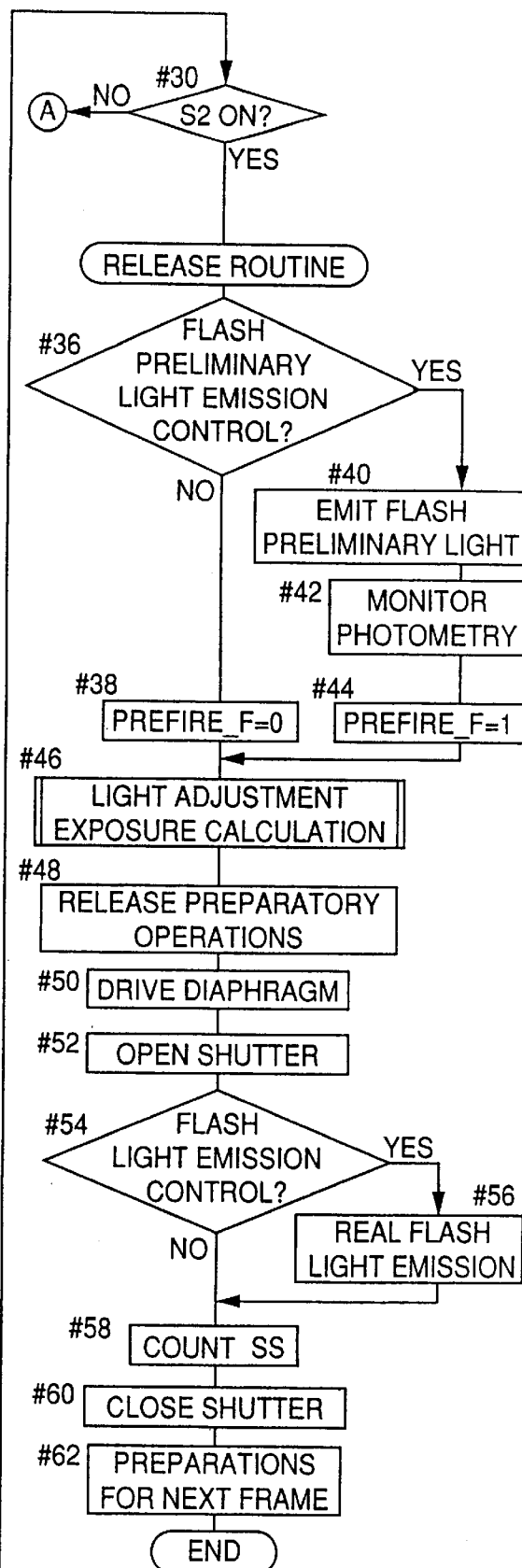

CAMERA

This application is based on applications Nos. H10-259866 and H10-260130 filed in Japan on Sep. 14, 1998, the entire content of which is hereby incorporated by reference.

BACKGROUND OF THE INVENTION

1. Field of the Invention

The present invention relates to a camera that has a plurality of distance measurement regions for obtaining information used for focusing of the taking lens, and performs light adjustment control in which the emission of subject illuminating light is ended when the quantity of reflected light from the subject reaches a predetermined quantity.

2. Description of the Prior Art

With a camera provided with multi-point distance measurement means having a plurality of distance measurement regions, the accuracy of focus detection can be improved. This is because in the multi-point distance measurement means, the probability that the subject is not present in any of the distance measurement regions is low and by selecting the distance measurement region in which the subject is present, focus detection can be performed based on the distance measurement information of the region.

Moreover, a camera is known that performs the light adjustment control by use of distance information from a plurality of distance measurement regions in flash shooting. This camera has multi-segment light adjustment means comprising a plurality of light adjustment regions including regions corresponding to a plurality of distance measurement regions. In flash shooting, the reflected light of the emitted light is detected by the multi-segment light adjustment means, and when the sum total of the light reception quantities of the light adjustment regions reaches a reference value, the light emission is stopped. The contribution percentages of the light adjustment regions and the reference value in obtaining the sum total of the light reception quantities can be changed, for example, according to the position of the subject and the distance to the background. As described above, by performing the light adjustment control based on the distance measurement information obtained by the multi-point distance measurement means, the subject can be illuminated at an appropriate brightness.

In the multi-point distance measurement means having a plurality of distance measurement regions, focus detection can be controlled when the distance measurement information of the region in which the subject is present is obtained. When distance measurement information of the multi-point distance measurement means is used in the light adjustment control as described above, it is desirable that the distance measurement information of all the distance measurement regions be obtained. However, under low-light conditions in which flash shooting is frequently performed, correct distance measurement information of all the distance measurement regions cannot be obtained in many cases because of low contrast, so that it is difficult to correctly perform the light adjustment control.

In the light adjustment control of a camera, as information for deciding the contribution percentages and the reference value, photometric information in preliminary light emission performed prior to the real light emission shooting is effective as well as the distance measurement information. This is because the light adjustment control can be performed with reference to the brightness of the subject. Which of the distance measurement information and the photometric information in preliminary light emission performed prior to the real light emission shooting is more reliable differs according to the focal length in flash shooting and various shooting conditions. There are cases where one of these pieces of information is completely invalid according to shooting conditions.

The photometric information in preliminary light emission is more reliable, for example, in the following shooting conditions:

when the distance information is invalid like in manual focusing;

when the image magnification is low and sufficiently accurate distance information is not obtained; and when the main subject and the background are near to each other.

The distance measurement information obtained by the multi-point distance measurement means is more reliable, for example, in the following shooting conditions:

when the focal length is extremely short and the light emission angle in preliminary emission is exceeded;

when the shooting distance is too short and preliminary light emission cannot correctly be performed because of an effect of parallax; and when photometric information by correct preliminary light emission cannot be obtained because bounce setting is made or a diffuser is attached.

Moreover, in the following shooting conditions, appropriate control is performed by calculating the contribution percentages and the reference value by combining the above-mentioned two pieces of information:

when excellent distance accuracy is not obtained and correct photometric information in preliminary light emission is not obtained (for example, when the focal length is short, the image magnification is low, and the subject and the background are near to each other).

As described above, between the distance measurement information obtained by the multi-point distance measurement means and the photometric information in preliminary light emission performed prior to the real light emission shooting, the reliability as the information used in calculating the contribution percentages and the reference value in light adjustment control differs according to the focal length in the real light emission shooting and various shooting conditions. This is not considered in conventional cameras. Therefore, inappropriate contribution percentages and reference value are calculated according to the focal length in the real light emission shooting and shooting conditions. As a result, there are cases where the subject cannot be illuminated at a desired brightness.

SUMMARY OF THE INVENTION

An object of the present invention is to provide a flash control apparatus and a camera capable of appropriate light adjustment control even in low light. Another object of the present invention is to provide a camera capable of appropriate light adjustment control irrespective of the focal length and shooting conditions.

To achieve the above-mentioned objects, according to an aspect of the present invention, a flash control apparatus comprises: a distance measurement device having a plurality of distance measurement regions and for outputting distance measurement information of each distance measurement region; a light adjustment device having a plurality of light adjustment regions including regions substantially coinciding with the distance measurement regions; an auxiliary light emitting device for emitting auxiliary light at the time of distance measurement; and a controller for controlling a flash light emission quantity based on distance measurement information in auxiliary light emission, and an output from the light adjustment device.

According to another aspect of the present invention, a camera controlling a flash apparatus for illuminating a subject comprises: a distance measurement device for outputting distance measurement information to a subject; a first calculator for calculating a first light emission quantity control value of the flash apparatus based on the distance measurement information; a first controller for performing preliminary light emission with the flash apparatus; a photometric device for performing photometry of light reflected from the subject in the preliminary light emission and outputting photometric information; a second calculator for calculating a second light emission quantity control value of the flash apparatus based on the photometric information; a third calculator for deciding allocation percentages of the first light emission quantity control value and the second light emission quantity control value; a fourth calculator for calculating a third light emission quantity control value of the flash apparatus based on the first light emission quantity control value, the second light emission quantity control value and the allocation percentages; and a second controller for controlling emitted light in real light emission by the flash apparatus based on the third light emission quantity control value.

According to still another aspect of the present invention, a camera controlling a flash apparatus for illuminating a subject comprises: a distance measurement device for outputting distance measurement information to a subject; a light adjustment device having a plurality of light adjustment regions; a first calculator for calculating, based on the distance measurement information, a first contribution percentage of the light adjustment device corresponding to each of the light adjustment regions; a first controller for performing preliminary light emission with the flash apparatus; a photometric device having a plurality of photometric regions and for performing photometry of light reflected from the subject in the preliminary light emission and outputting photometric information; a second calculator for calculating, based on the photometric information, a second contribution percentage of the light adjustment device corresponding to each of the light adjustment regions; a third calculator for deciding allocation percentages of the first contribution percentage and the second contribution percentage; a fourth calculator for calculating a third contribution percentage based on the first contribution percentage, the second contribution percentage and the allocation percentages; and a second controller for controlling emitted light in real light emission by the flash apparatus based on the third contribution percentage.

BRIEF DESCRIPTION OF THE DRAWINGS

These and other objects and features of this invention will become clear from the following description, taken in conjunction with the preferred embodiments with reference to the accompanying drawings in which:

FIG. 9 is a flowchart showing a schematic flow of the entire control operation performed in a release priority mode;

DESCRIPTION OF THE PREFERRED EMBODIMENTS

Hereinafter, an autofocus camera according to an embodiment of the present invention will be described with reference to the drawings. An autofocus camera 1 (hereinafter, sometimes referred to as camera) of this embodiment is a lens interchangeable single-lens reflex camera to which various types of taking lenses can be attached, and performs automatic focusing (AF) of the taking lens by the phase difference detection method. Examples of structures associated with the control of the camera 1 are shown in FIGS. 1 to 4.

Figure 1:
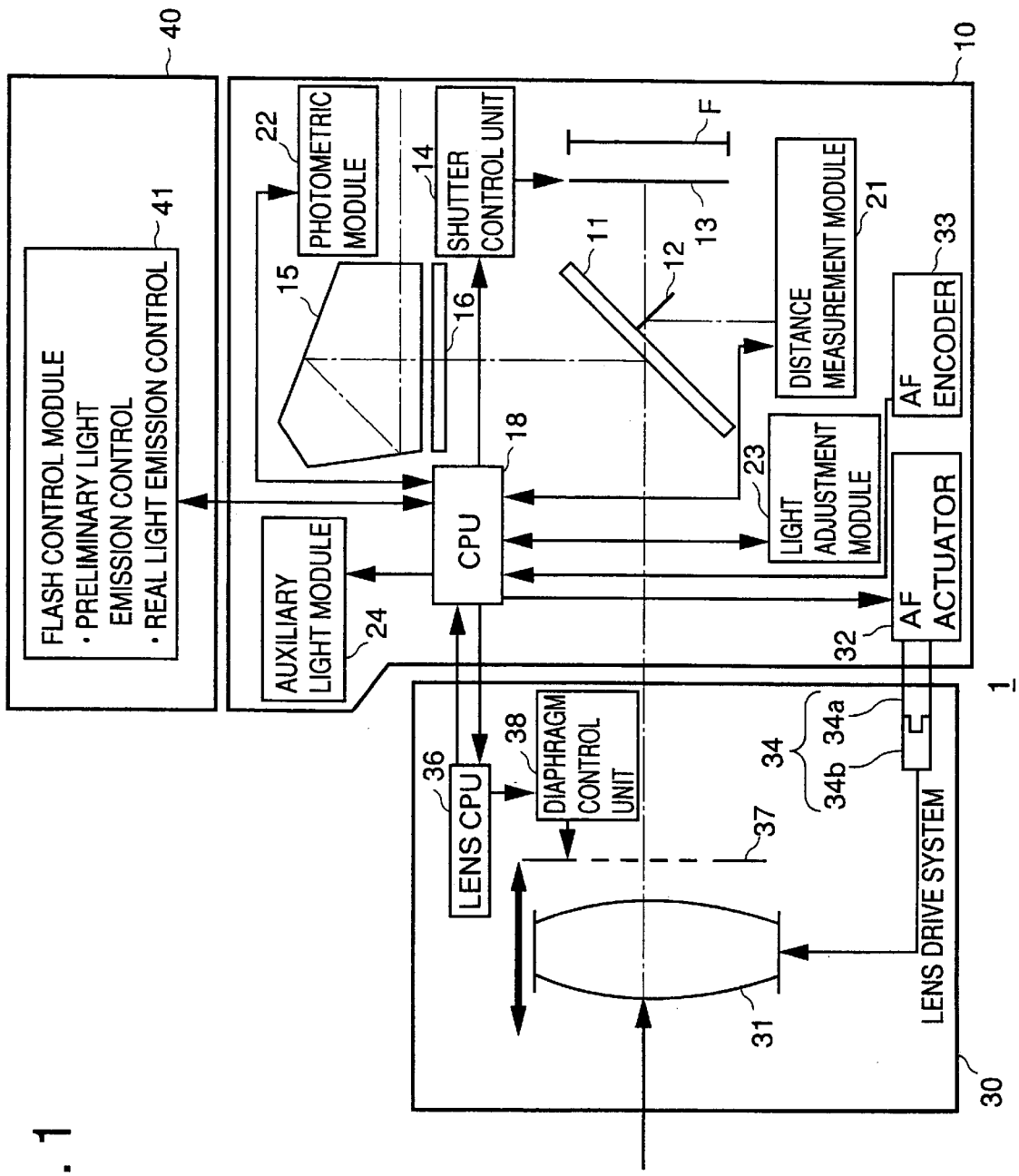
FIG. 1 shows an example of the structure associated with the control of a camera according to an embodiment of the present invention.
Figure 2:
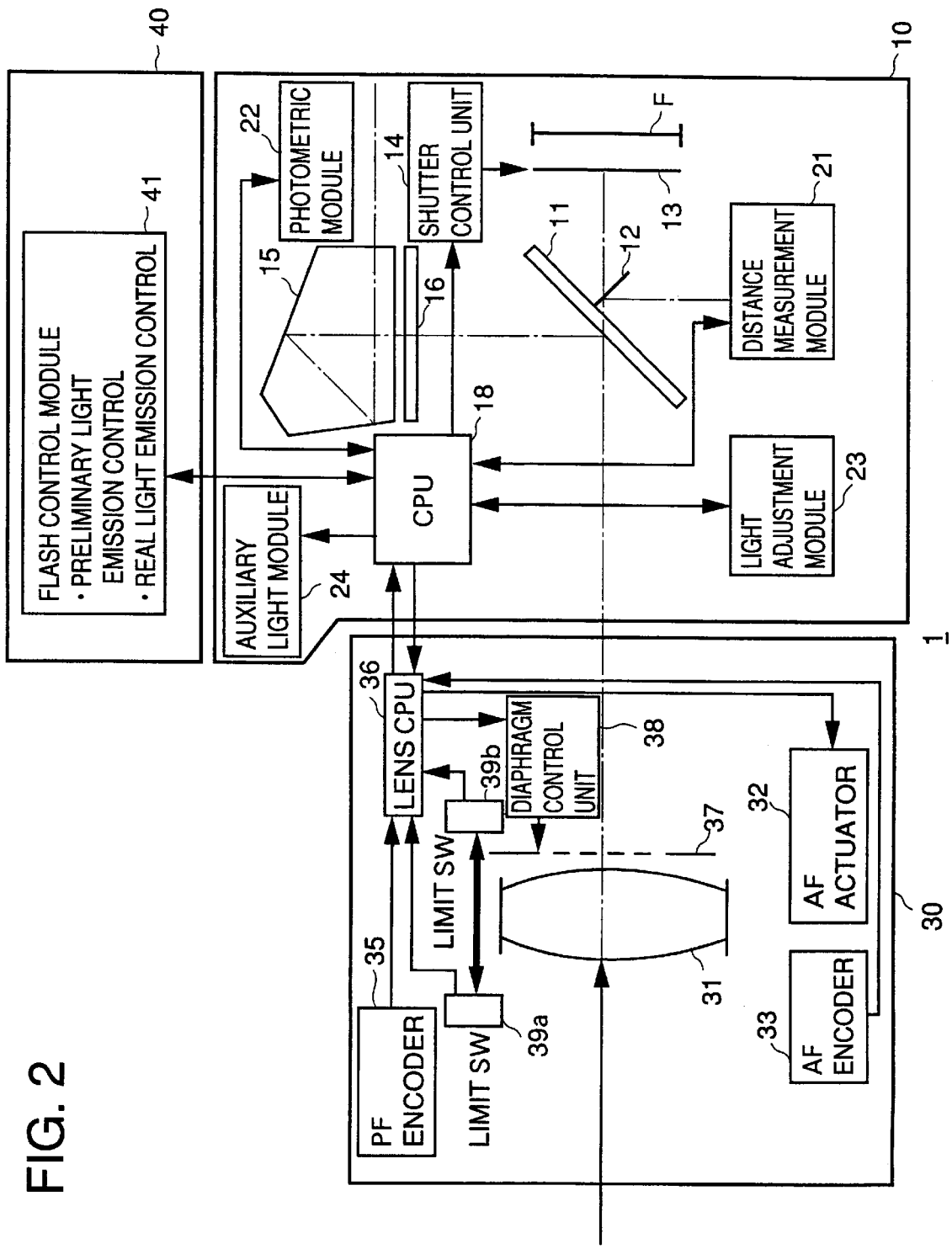
FIG. 2 shows another example of the structure associated with the control.
Figure 3:
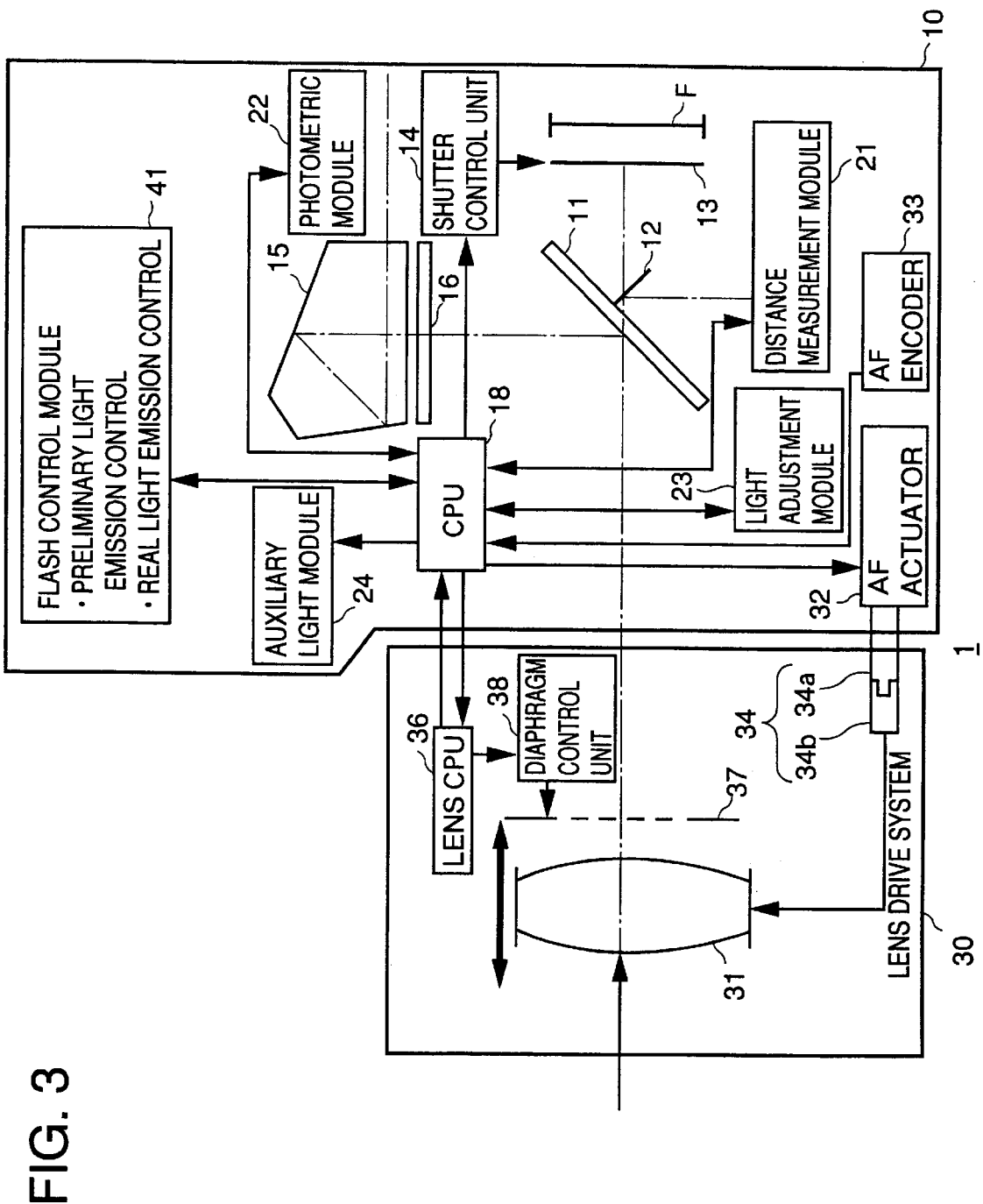
FIG. 3 shows another example of the structure associated with the control.
Figure 4:
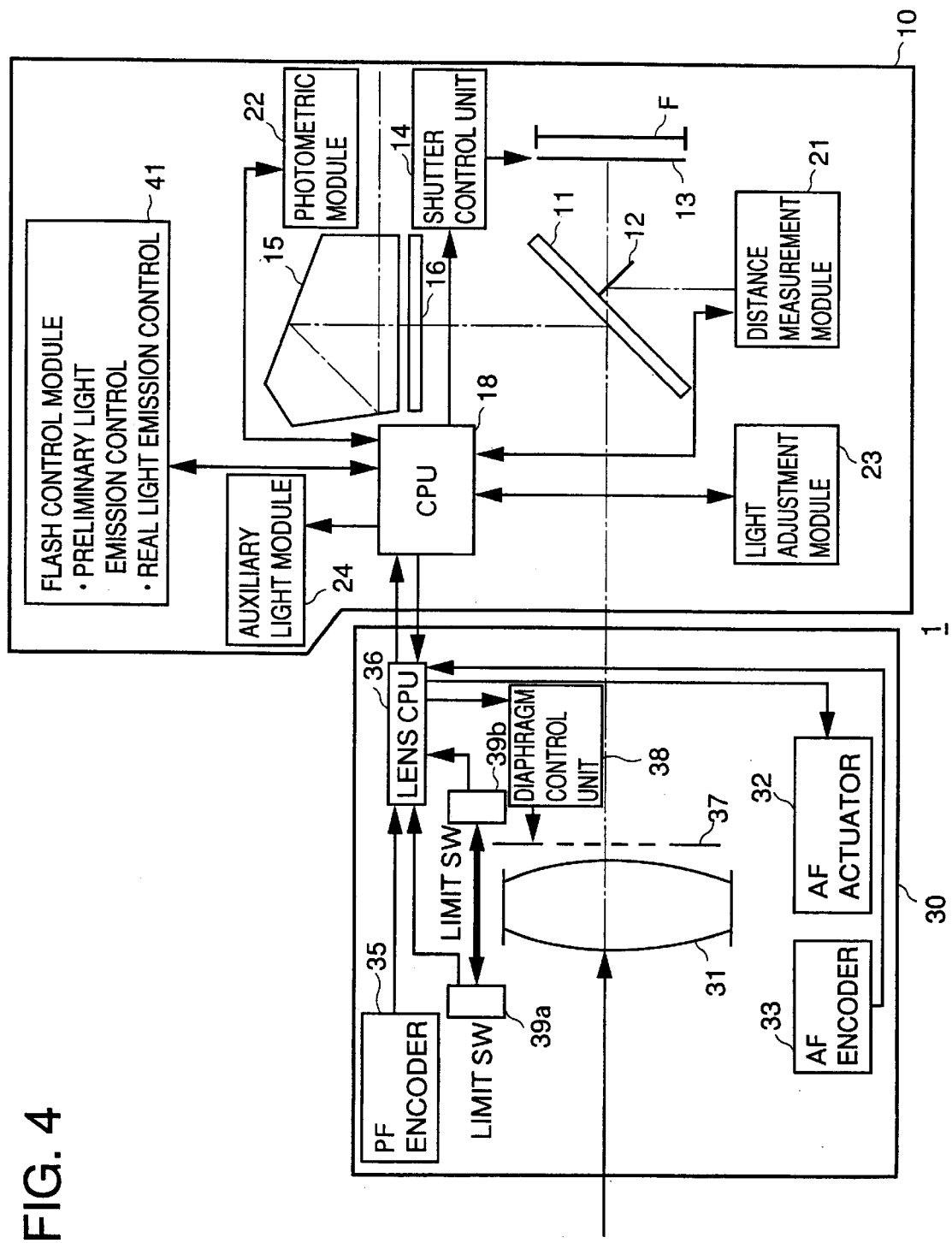
FIG. 4 shows another example of the structure associated with the control.

The camera 1 comprises a camera body 10 and a taking lens 30. In the structures of FIGS. 1 and 2, a flash portion 40 for emitting light for illuminating the subject can be attached to the top of the camera body 10. In the structures of FIGS. 3 and 4, the flash portion is incorporated in the camera body 10.

In the structures of FIGS. 1 and 3, an AF actuator 32 for driving a focusing lens 31 for focusing of the taking lens 30 and an AF encoder 33 for detecting the driving amount of the AF actuator 32 are incorporated in the camera body 10. In the structures of FIGS. 2 and 4, the AF actuator 32 and the AF encoder 33 are incorporated in the taking lens 30. In the structures in which the AF actuator 32 is incorporated in the camera body 10, coupler pieces 34a and 34b coupled with each other to form a coupler 34 are provided in the camera body 10 and the taking lens 30, respectively. The driving force of the AF actuator 32 is transmitted to the focusing lens 31 through the coupler 34.

In the structures in which the AF actuator 32 is incorporated in the taking lens 30, manual focusing (MF) in which focusing of the taking lens 30 is performed by the user's manual operation can also be performed. As the manual focusing method, this embodiment adopts power focusing (PF) in which the position of the focusing lens 31 is varied by driving the AF actuator 32 in response to the user's operation. For manual focusing, the taking lens 30 has an operation ring (not shown) on the periphery thereof and has a PF encoder 35 for detecting the rotation of the operation ring.

The camera body 10 has a main mirror 11 of flip-up type, a sub mirror 12 attached to the main mirror 11, a shutter 13 disposed immediately ahead of silver halide film F situated behind the main mirror 11, a shutter control unit 14 for controlling the opening and closing of the shutter 13, a pentagonal prism 15 for directing the light upwardly reflected at the main mirror 11 to the user's eye, an imaging plate 16 disposed between the main mirror 11 and the pentagonal prism 15, and a CPU 18 for controlling the entire operation of the camera 1. The main mirror 11 has a semitransparent part in the center thereof. The light passing through the semitransparent part is downwardly reflected at the sub mirror 12.

In addition to the above-mentioned elements, the camera body 10 has a distance measurement module 21 for receiving light reflected at the sub mirror 21 to obtain information on the distance to the subject, a photometric module 22 for detecting the quantity of the light reflected at the main mirror 11, a light adjustment module 23 for detecting the quantity of the light reflected at the film F in flash shooting, and an auxiliary light module 24 for emitting AF auxiliary light. The outputs of the distance measurement module 21, the photometric module 22 and the light adjustment module 23 are supplied to the CPU 18 and used for focusing of the taking lens 30, exposure control, and light adjustment control in flash shooting, respectively.

The taking lens 30 has, in addition to the focusing lens 31, a diaphragm 37 for restricting the light quantity, a diaphragm control unit 38 for opening and closing the diaphragm 37, and a lens CPU 36 for controlling the entire lens. The lens CPU 36 communicates with the CPU 18 of the camera body 10 to transmit and receive information necessary for control. In the structures of FIGS. 2 and 4 in which the AF actuator 32 for driving the focusing lens 31 is provided in the taking lens 30, limit switches 39a and 39b for detecting that the focusing lens 31 is situated at the near side limit or at the infinity side limit are also provided.

The absolute position of the focusing lens 31 can be found from the amount of driving from a limit with the limit as the reference position. The taking lens 30 may be provided with a mechanism for directly detecting the absolute position of the focusing lens 31. By providing this mechanism, the absolute position of the focusing lens 31 can be found even when the coupler pieces 34a and 34b are not coupled in the structures of FIGS. 1 and 3.

The flash portion 40 has a flash control module 41 for controlling light emission as well as devices (not shown) for emitting light toward the subject such as a xenon lamp, a capacitor and a reflecting mirror. The direction of light emission of the flash portion 40 is variable, and bounce emission in which flash light is applied to a surrounding object such as a ceiling and the subject is illuminated by the reflected light of the flash light can be performed. Flash bracket shooting in which a plurality of frames are continuously exposed while the light emission quantity is stepwisely changed can also be performed. Moreover, a diffuser can be attached to the front surface of the flash portion 40 in order to diffuse the emitted light. The direction of light emission and the attachment of a diffuser are detected by the flash control module 41 and transmitted to the CPU 18. The light emission may be flat emission or flat pulse (FP) emission as well as general flash light emission.

The distance measurement module 21 has a multi-point distance measurement device having a plurality of distance measurement regions. In each distance measurement region, a pair of line sensors or area sensors and an optical system for directing light beams of different parts of a luminous flux to the sensors are provided. The distance measurement module 21 outputs signals representative of the light reception amounts of pixels as distance measurement data from all the sensors to the CPU 18. The output of data by the distance measurement module 21 is repetitively performed at substantially fixed short intervals.

The CPU 18 generates, for each distance measurement region, distance measurement information used for focusing of the taking lens 30 and in-focus determination from the data supplied from the distance measurement module 21. Specifically, for all the sensors, the difference in light reception amount between adjoining pixels is obtained to generate data representative of the contrast of the image on the sensor, and for each distance measurement region, the contrast data are compared between the sensors to detect the correspondence between the images on the sensors. Then, from the distance between corresponding parts of the images, the position is calculated at which the light from the shooting range corresponding to the distance measurement region is imaged after having passed through the taking lens 30, the distance between the calculated imaging position and the film F is obtained, and the obtained value is set as the defocus amount DF. When the contrasts on the sensors are low and the correspondence between the images on the sensors cannot be found, the defocus amount cannot be obtained.

In consideration of the contrast, the defocus amount and the defocus direction, that is, whether the imaging position of the light having passed through the taking lens 30 is situated in the front or in the rear of the film F, the CPU 18 determines which one of the distance measurement regions for which the defocus amount can be obtained includes the image of the subject which is the main object of shooting, and performs focusing of the taking lens 30 and in-focus determination based on the defocus amount of the distance measurement region including the subject image. When the defocus amount is not more than a predetermined reference value, the CPU 18 determines that the taking lens 30 is focused on the subject, and stops focusing of the taking lens 30, that is, locks the in-focus state.

When the absolute position of the focusing lens 31 of the taking lens 30 is known, the distance on which the taking lens 30 is focused is found. In such a case, the distance DV to an object in the shooting range in each distance measurement region can be obtained from the distance on which the taking lens 30 is focused and the distance between corresponding parts of the images on the sensors in each distance measurement region. The distance DV (hereinafter, referred to as detection distance) can be used for focusing of the taking lens 30 and in-focus determination as distance measurement information.

The photometric module 22 has a multi-segment photometric device having a plurality of photometric regions, receives ambient light with each of the photometric regions, and outputs the light reception quantities of the photometric regions to the CPU 18. The CPU 18 assigns weights to the light reception quantities of the photometric regions to obtain the weights average, calculates an appropriate exposure value from the obtained weights average and the speed, i.e., sensitivity of the film F, and sets the release time of the shutter 13, that is, the shutter speed and the aperture of the diaphragm 37, that is, the aperture value.

In the camera 1, the exposure control mode can be selected from among the following four modes: a program mode in which the shutter speed and the aperture value are set in accordance with a predetermined relationship; a shutter priority mode in which the aperture value is set in accordance with the shutter speed specified by the user; an aperture priority mode in which the shutter speed is set in accordance with the aperture value specified by the user; and a manual mode in which the shutter speed and the aperture value specified by the user are adopted. In the manual mode, although the setting does not conform to the exposure value calculated by the CPU 18, whether the exposure at the shutter speed and the aperture value specified by the user is appropriate or not is determined based on the calculated exposure value, and the result of the determination is displayed.

The weights assigned to the photometric regions are variable. The CPU 18 sets the weights assigned to the photometric regions in accordance with the position of the subject. Consequently, an exposure value where the exposure is appropriate for the subject can be set while considering the brightness of the background. Moreover, depending on the weight assignment to the photometric regions, exposure control can be performed by various photometric methods such as spot metering, center-weighted metering and averaging metering.

Figure 5:
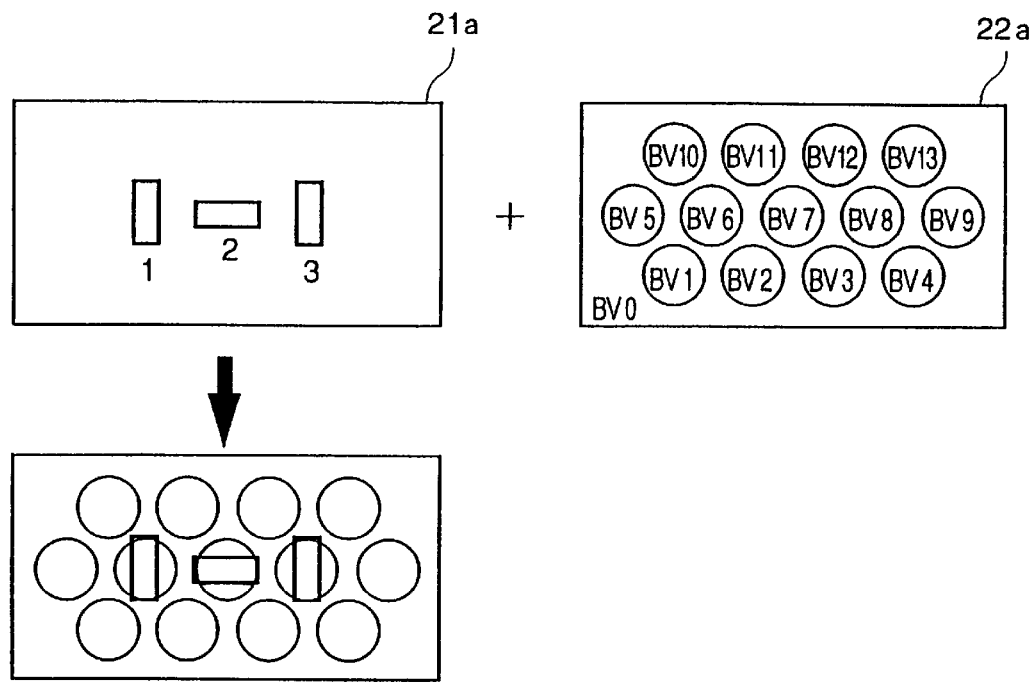
FIG. 5 shows a relationship between a multi-point distance measurement device and a multi-segment photometric device.

In the camera 1 of this embodiment, the number of distance measurement regions of the multi-point distance measurement device is three and the number of photometric regions of the multi-segment photometric device is fourteen. A relationship between a multi-point distance measurement device 21a and a multi-segment photometric device 22a is shown in FIG. 5. The outlines of the multi-point distance measurement device 21a and the multi-segment photometric device 22a substantially correspond to the outline of the shooting range of one frame of the film F. When the three distance measurement regions of the multi-point distance measurement device 21a are designated as regions 1 to 3, the region 2 is situated in the center of a frame of the film F, and the regions 1 and 3 are situated on the left and the right of the region 2. In the region 2, a pair of sensors are disposed in the horizontal direction. In each of the regions 1 and 3, a pair of sensors are disposed in the vertical direction.

When the fourteen photometric regions of the multi-segment photometric device 22a are designated as regions BV0 to BV13, the regions BV1 to BV13 have the same size, and are disposed in three horizontal rows. The regions BV1 to BV4 are disposed in the bottom row, the regions BV5 to BV9 are disposed in the central row, and the regions BV10 to BV13 are disposed in the top row. The distances among the regions BV1 to BV13 are the same. The three regions BV6 to BV8 in the central row are each surrounded by the other six regions. The region other than the regions BV1 to BV13 is the region BV0.

The regions BV6, BV7 and BV8 are situated at positions corresponding to the regions 1, 2 and 3 of the multi-point distance measurement device 21a, respectively. Consequently, when the subject is situated, for example, in the region 1, the light from the subject is detected in the region BV6.

The light adjustment module 23 has a multi-segment light adjustment device having a plurality of light adjustment regions. In the flash shooting, the light adjustment module 23 receives the emitted light reflected at the subject and the background with each of the light adjustment regions, and outputs the light reception quantities of the light adjustment regions to the CPU 18. When the sum total of the light reception quantities of the light adjustment regions reaches a predetermined reference value, the CPU 18 determines that an appropriate quantity of light is emitted to the subject, and stops light emission through the flash control module 41.

The reference value for stopping the light emission is variable. The CPU 18 sets the reference value in accordance with the distribution of the light reception quantities among the light adjustment regions and the position of the subject. The contribution percentages of the light adjustment regions for obtaining the sum total of the light adjustment quantities are also variable. The CPU 18 sets the contribution percentages of the light adjustment regions in accordance with the position of the subject. Consequently, the subject can be illuminated at an appropriate brightness while considering the brightness of the background.

Figure 6:
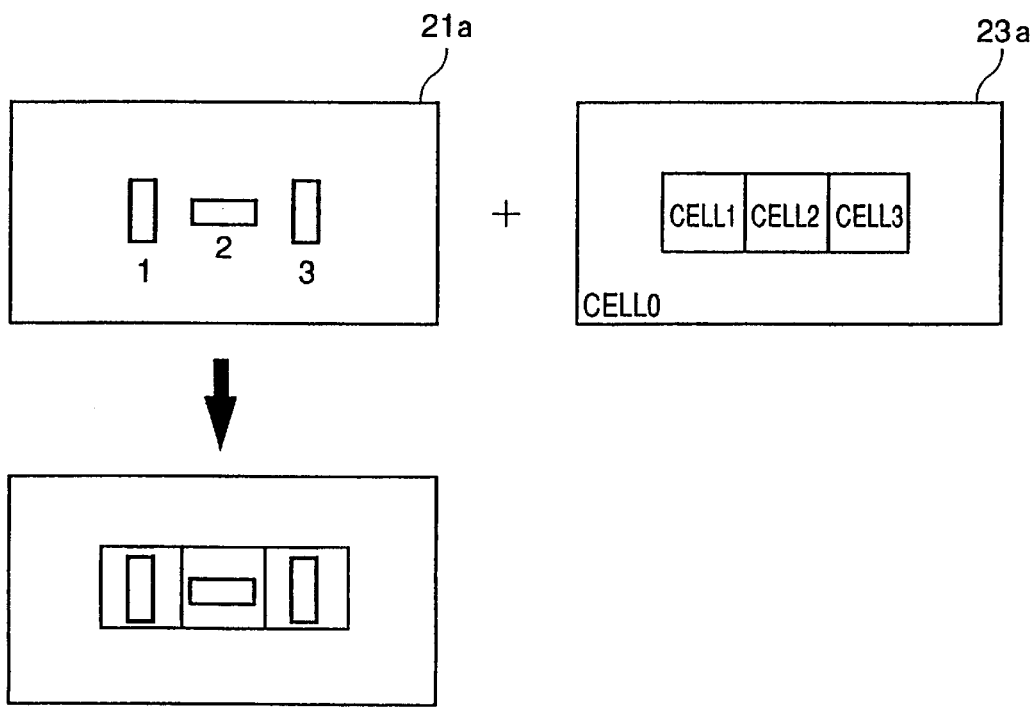
FIG. 6 shows a relationship between the multi-point distance measurement device and a multi-segment light adjustment device.

In the camera of this embodiment, the number of light adjustment regions of the multi-segment light adjustment device is four. A relationship between the multi-point distance measurement device 21*a* and a multi-segment light adjustment device 23*a* is shown in FIG. 6. When the four light adjustment regions of the multi-segment light adjustment device 23*a* are designated as cells 0 to 3, the cells 1 to 3 have the same size, the cell 2 is disposed in the center, and the cells 1 and 3 are disposed on the left and the right of the cell 2. The region other than the cells 1 to 3 is the cell 0.

The cells 1, 2 and 3 are situated at positions corresponding to the regions 1, 2 and 3 of the multi-point distance measurement device 21, respectively. Consequently, when the subject is situated, for example, in the region 1, the emitted light reflected at the subject is detected in the cell 1.

Figure 7:
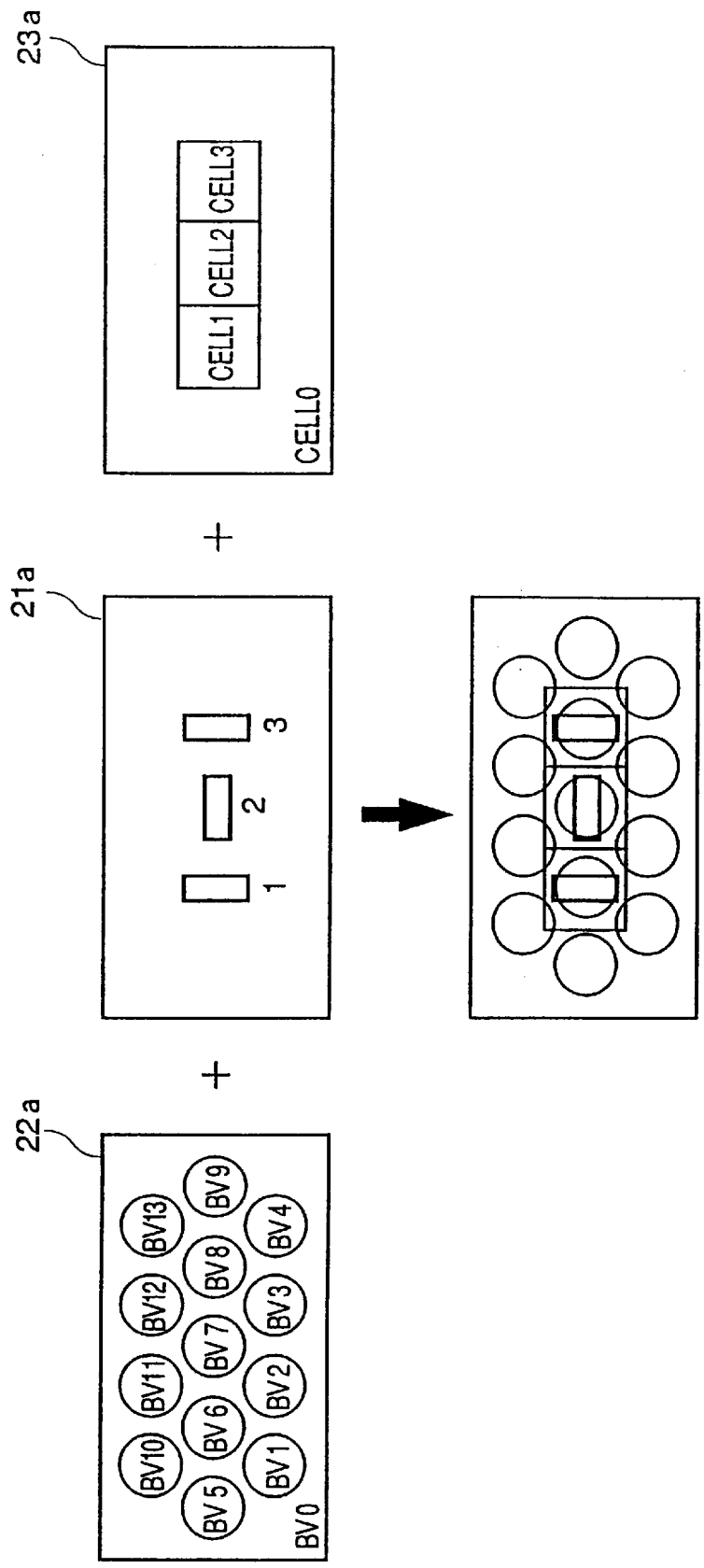
FIG. 7 shows a relationship among the multi-point distance measurement device, the multi-segment photometric device and the multi-segment light adjustment device.

A positional relationship among the multi-point distance measurement device 21*a*, the multi-segment photometric device 22*a* and the multi-segment light adjustment device 23*a* is shown in FIG. 7. The three distance measurement regions are included in the three photometric regions and in the three light adjustment regions, so that the position of the subject detected by the multi-point distance measurement device 21*a* can directly be used for exposure control and light adjustment control. That is, by increasing the weight of the photometric region corresponding to the distance measurement region used for the in-focus determination, the CPU 18 can perform exposure control with emphasis on the brightness of the subject, and by increasing the contribution percentage of the light adjustment region corresponding to the distance measurement region used for the in-focus determination, the CPU 18 can perform light adjustment control with emphasis on the illumination of the subject.

The numbers and the dispositions of the distance measurement regions of the multi-point distance measurement device 21*a*, the photometric regions of the multi-segment photometric device 22*a* and the light adjustment regions of the multi-segment light adjustment region 23*a* shown here are only examples, and can be set to different numbers and dispositions.

The camera 1 has the following two shooting modes: an AF priority mode in which shooting is not performed until the taking lens 30 is focused on the subject after an instruction to start shooting is provided; and a release priority mode in which irrespective of whether the taking lens 30 is focused on the subject or not, shooting is immediately performed when an instruction to perform shooting is provided. In either of the shooting modes, distance measurement information is used for exposure control and for light adjustment control in flash shooting as well as for focusing of the taking lens 30.

Figure 8:
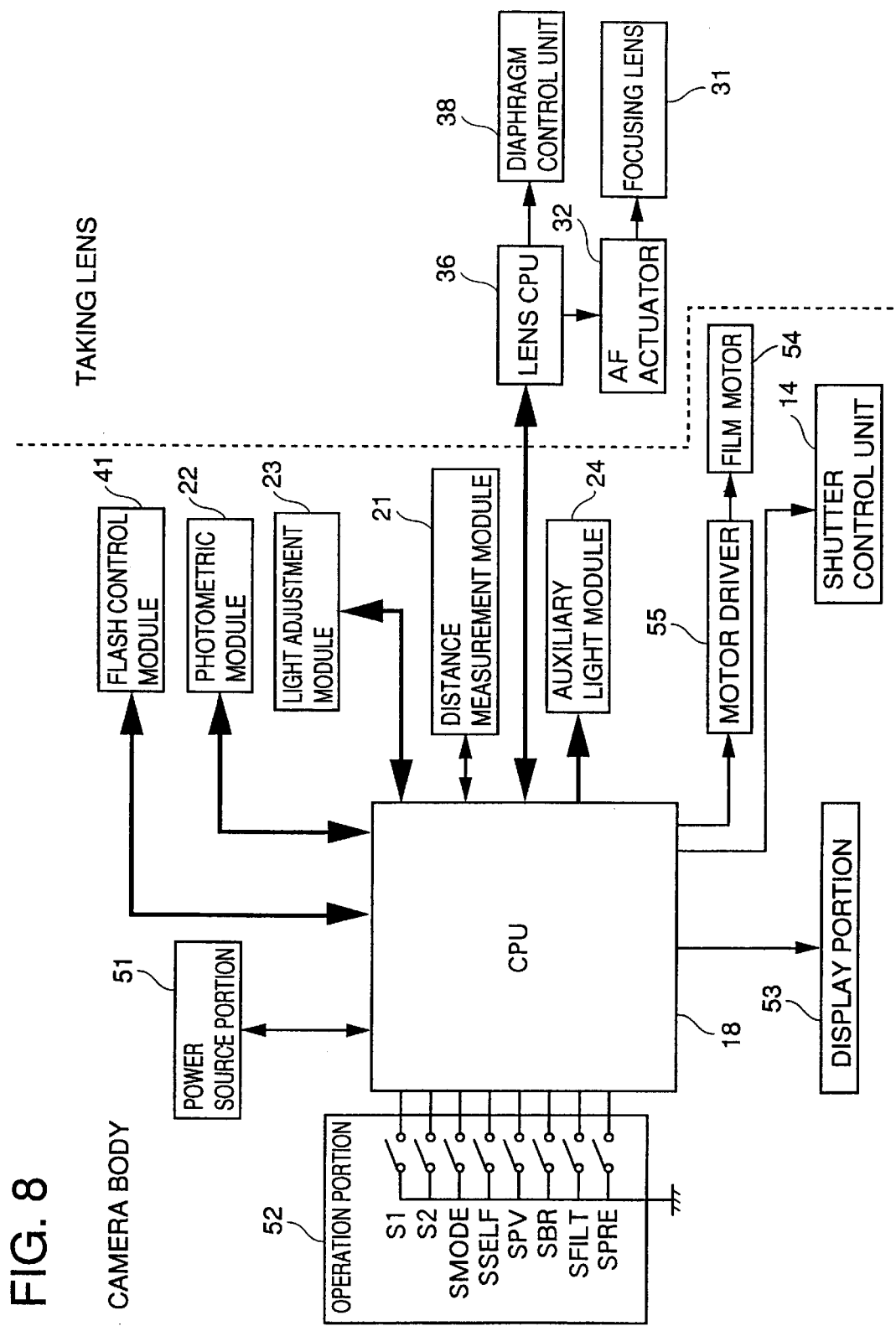
FIG. 8 is a block diagram schematically showing the circuit structure for operation control.

FIG. 8 schematically shows the circuit configuration for controlling the operation of the camera 1. In addition to the above-described circuits such as the distance measurement module 21 and the light adjustment module 23, the camera 1 has a power source portion 51 for supplying power to the parts requiring power, an operation portion 52 operated by the user, a display portion 53 for displaying various pieces of information such as the setting condition of the camera 1, a motor 54 for feeding the film F, and a driver 55 for driving the motor 54. The CPU 18 controls the power supply from the power source portion 51, and stops the power supply when the operation portion 52 is not operated for a predetermined time.

The CPU 18 causes the distance measurement module 21 to repetitively perform distance measurement, obtains distance measurement information for all the distance measurement regions in each distance measurement, and performs focusing of the taking lens 30 in accordance with the distance measurement information. FIG. 8 shows the structure of FIGS. 2 and 4 in which the AF actuator 32 is provided in the taking lens 30, and focusing of the taking lens 30 is performed through the lens CPU 36. In the structure in which the AF actuator 32 is provided in the camera body 10, the CPU 18 directly controls the AF actuator 32.

The lens CPU 36 supplies the CPU 18 with information on the taking lens 30 such as the focal length of the taking lens 30 and the full aperture value of the diaphragm 37. The CPU 18 uses the information for controlling the camera 1. The lens CPU 36 controls the opening and closing of the diaphragm 37 through the diaphragm control unit 38 in accordance with an instruction from the CPU 18.

The CPU 18 receives from the flash control module 41 information on the setting of the flash portion 40 such as the direction of light emission for bounce emission and whether a diffuser is attached or not, and provides the flash control module 41 with instructions associated with light emission and preparations for light emission such as instructions to charge the capacitor, to start light emission and to stop light emission.

The CPU 18 provides the photometric module 22 with instructions to start and end photometry, receives information representative of the light reception quantities of the photometric regions from the photometric module 22, and uses the information for exposure control. In flash shooting, the CPU 18 provides the light adjustment module 23 with an instruction to start light reception, and receives information representative of the light reception quantities of the light adjustment regions from the light adjustment module 23. The instruction to start light reception is supplied in synchronism with the instruction to start light emission supplied to the flash control module 41.

When the contrast of the images on the sensors of the distance measurement module 21 is low and appropriate distance measurement information cannot be obtained, the CPU 18 provides an instruction to the auxiliary light module 24 to cause it to emit AF auxiliary light. In order to use the distance measurement information for exposure control and light adjustment control, AF auxiliary light is also emitted as required after the in-focus state is locked.

The operation portion 52 has various operation members such as a button and a dial. The operation members each have a switch for transmitting the operation condition thereof to the CPU 18. These switches include a switch S1, a switch S2, a mode switch SMODE, a self timer switch SSELF, a preview switch SPV, a bracket switch SBR, a filter attachment switch SFILT and a preliminary light emission switch SPRE. The settings of the switches are transmitted to the CPU 18.

The switch S1 is closed when the release button (not shown) is half depressed. The switch S2 is closed when the release button is fully depressed. Signals generated by the switches S1 and S2 being closed are designated as signals S1 and S2, respectively. The signal S1 provides an instruction to start control operations. The CPU 18 repetitively performs predetermined control operations necessary for shooting such as the generation of distance measurement information, focusing of the taking lens 30 and calculation of the exposure value while receiving the signal S1, that is, while half depressing the release button.

The signal S2 provides an instruction to start shooting, that is, exposure of the film F. Receiving the signal S2, the CPU 18 immediately opens the shutter 13 in the release priority mode, and opens the shutter 13 when the taking lens 30 is focused on the subject in the AF priority mode. At this time, in accordance with the set exposure control mode, the shutter speed and the aperture value are set to the values calculated from the output of the photometric module 22 or the values specified by the user. When flash shooting is performed, the CPU 18 causes the flash control module 41 to emit light and causes the light adjustment module 23 to receive the emitted light.

The mode switch SMODE provides an instruction to make a shooting mode selection between the AF priority mode and the release priority mode. The self timer switch SSELF provides an instruction to perform self timer shooting in which shooting is started when a predetermined time has elapsed after operation. The preview switch SPV provides an instruction to stop down the diaphragm 37 to the calculated or specified aperture value. The bracket switch SBR provides an instruction to perform bracket shooting in which a plurality of frames are exposed while varying the exposure value so as to include the calculated optimum exposure value. The filter attachment switch SFILT detects the attachment of a filter to the taking lens 30. The preliminary light emission switch SPRE provides an instruction as to whether to perform preliminary light emission or not in advance in flash shooting.

Although not shown, the operation portion 52 has, in addition to the above-mentioned members, various switches such as a power source switch providing an instruction to start power supply, a switch providing an instruction to select an exposure control mode and a switch providing an instruction to make a selection between automatic focusing and manual focusing.

The display portion 53 comprises a liquid crystal display (LCD) and a light emitting diode (LED), and displays various pieces of information on conditions of the camera 1 such as the shooting mode, the exposure control mode, the number of unexposed frames of the film F, the remaining power of the power source portion 51 and the focus condition of the taking lens 30. The display portion 53 is disposed on the top surface of the camera body 10 and on the periphery of the pentagonal prism 15 in the finder.

The focusing control, the exposure control and the light adjustment control in the camera 1 will be described with reference to FIGS. 9 to 28. FIG. 9 is a flowchart showing a schematic flow of the entire control operation performed in the release priority mode of the camera 1. After the operation is started, the CPU 18 clears to 0 a flag DVCALOK_F for indicating whether distance measurement information is obtained for all the distance measurement regions or not (step #2), and determines whether the signal S1 generated by half depressing the release button is present or absent (#4). When the signal S1 is absent, the process returns to #2 and waits until the release button is operated.

When the signal S1 is present, the distance measurement module 21 is caused to output distance measurement data (#6), and a calculation to obtain distance measurement information is performed (#8). The distance measurement information obtained here is used for focusing and in-focus determination, and also for exposure control and light adjustment control based on the subject position of immediately before the shooting. Then, drive control to drive the focusing lens 31 of the taking lens 30 is performed in accordance with the distance measurement information (#10). In the drive control, the CPU 18 only instructs the AF actuator 32 to drive the focusing lens 31 by a predetermined amount and does not wait until the driving is completed. When it is determined from the distance measurement information obtained at #8 that the taking lens is focused on the subject, the CPU 18 stops instructing the AF actuator to drive the focusing lens 31, and locks the in-focus state.

Then, whether it is immediately after the in-focus state is locked or not is determined (#12). As mentioned later, steps #4 to #30 are repeated until the signal S2 is generated. At #12, whether it is immediately after the in-focus state is locked or not is determined based on whether or not this step is reached for the first time after the in-focus state is locked. When it is not immediately after the in-focus state is locked, the process proceeds to #24.

When it is immediately after the in-focus state is locked, it is determined whether there are one or more low-contrast distance measurement regions or not (#14). The number of low-contrast distance measurement regions is set in a flag LOWCON_NO at the calculation of #8, and the value is checked. When there is no low-contrast distance measurement region, the process proceeds to #20. When there is at least one low-contrast distance measurement region, the auxiliary light module 24 is caused to emit AF auxiliary light (#16) and the distance measurement data under a condition where the AF auxiliary light is used is obtained by the distance measurement module 21 (#18).

Then, a calculation to obtain distance measurement information is performed (#20). This calculation is for obtaining distance measurement information used for exposure control and light adjustment control, and is different from the calculation performed at #8. When there is no low-contrast distance measurement region, the distance measurement data obtained at #6 are used for the calculation. When there are one or more low-contrast distance measurement regions, the distance measurement data obtained at #18 are used for the calculation. Even when there are one or more low-contrast regions, since the contrast is increased by emitting AF auxiliary light, it is almost always possible to obtain distance measurement information for those distance measurement regions.

When the shooting ranges of the distance measurement regions are so far that the AF auxiliary light does not reach them, the contrast of the distance measurement regions remains low. In such a case, however, information that the shooting ranges are far is obtained. Consequently, distance measurement information is obtained for all the distance measurement regions. Then, the flag DVCALOK_F is set to 1 to indicate that distance measurement information is obtained for all the distance measurement regions (#22).

Next, information is obtained on shooting conditions such as the focal length of the taking lens 30, the selected exposure control mode, whether to perform preliminary light emission or not, whether to perform bounce light emission or not and whether a diffuser is attached or not (#24). Then, the photometric module 22 is caused to detect the ambient light reception quantity (#26), and an AE calculation to obtain the exposure value is performed based on the obtained light reception quantity and the distance measurement information obtained at #20 (#28).

By the above-described steps, the preparations for starting shooting are completed and shooting can be started as soon as an instruction is given. Therefore, it is determined whether the signal S2 generated by fully depressing the release button is present or absent (#30). When the signal S2 is absent, the process returns to #4 to repeat the above-described processing. When the user is not depressing the release button, the signal S1 is also absent. In such a case, the process waits until the signal S1 is again generated, and performs the processing from #6.

When the signal S2 is present, the process proceeds to a release routine. First, whether to perform preliminary light emission or not is determined (#36). When preliminary light emission is performed, the flash control module 41 is caused to perform preliminary light emission (#40). In preliminary light emission, the photometric module 22 is caused to perform photometry (#42). Then, a flag PREFIRE_F indicating that preliminary light emission is completed is set to 1 (#44). When preliminary light emission is not performed, the flag PREFIRE_F is cleared to 0 (#38). Then, a calculation to obtain light adjustment exposure is performed (#46). This calculation is for obtaining information used for light adjustment control. When preliminary light emission is performed, the photometric data in the preliminary light emission is used for the calculation.

Then, preparatory operations are performed such as retraction of the main mirror 11 from the optical path by flipping up the mirror 11 and charging of the shutter control unit 14 for opening the shutter 13 (#48), the diaphragm 37 is stopped down to the aperture value obtained by the AE calculation of #28 (#50), and the shutter is opened (#52). Then, whether to emit light or not is determined (#54). When light is to be emitted, the flash control module 41 is caused to emit light (#56). The light adjustment module 23 is instructed to start light reception at the same time when the flash control module 41 is caused to start light emission. When the light reception quantity reaches the reference value obtained at #28, the light emission is stopped.

The time that has elapsed since the shutter is opened is counted (#58). When the elapsed time reaches the value of the shutter speed (SS) obtained at #28, the shutter is closed (#60). Lastly, preparations for exposure of the next frame such as returning the main mirror, feeding the film and opening the diaphragm are made (#62), and the process ends.

Figure 10:
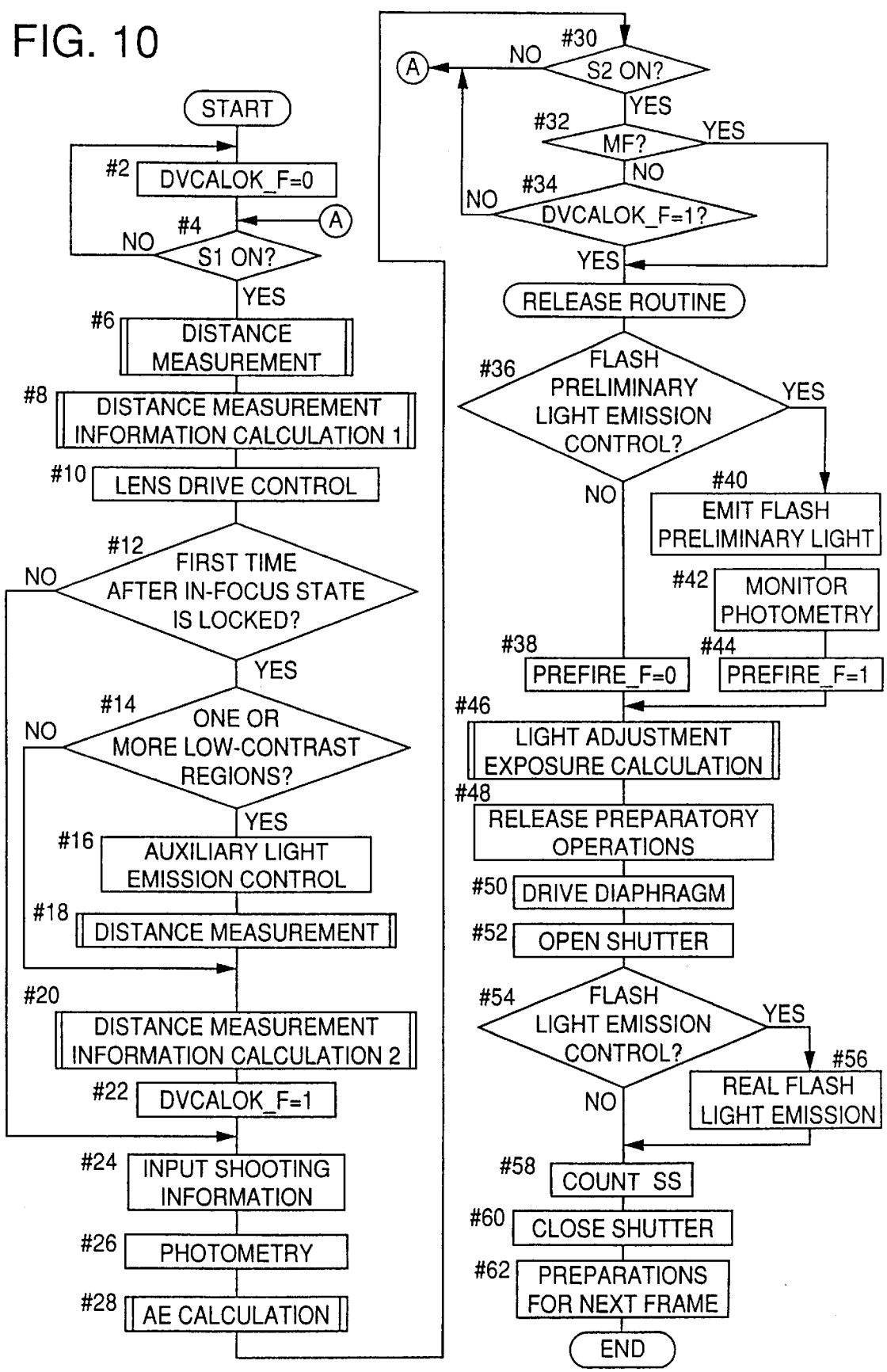
FIG. 10 is a flowchart showing a schematic flow of the entire control operation performed in an AF priority mode.

FIG. 10 is a flowchart showing a schematic flow of the entire control operation in the AF priority mode of the camera 1. The processing of the AF priority mode is different from that of the release priority mode in that steps #32 and #34 are present between steps #30 and #36.

In the AF priority mode, when an instruction to start shooting is provided by the signal S2 (#30), whether manual focusing is selected or not is determined (#32). When manual focusing is selected, the process proceeds to the release routine to perform the processing from #36. When not manual focusing but automatic focusing is selected, whether distance measurement information is obtained for all the distance measurement regions or not, that is, whether in-focus state is locked or not is determined based on whether the flag DVCALOK_F is 1 or not (#34). When the flag DVCALOK_F is 1, the process proceeds to the release routine. When the flag DVCALOK_F is 0, the process returns to #4 and waits until in-focus state is locked.

In manual focusing, the lens drive control of #10 is performed in accordance with the user's manual operation. In other respects, the processing is the same as that of the release priority mode. Therefore, no overlapping description will be given.

Now, the control processing will be described in more detail by using as an example a case in which the distance measurement module 21, the photometric module 22 and the light adjustment module 23 are disposed as shown in FIG. 7. Here, the distance measurement regions are denoted by numbers n (n=1 to 3), the photometric regions are denoted by numbers k (k=0 to 13) and the light adjustment regions are denoted by numbers m (m=0 to 3) so as to be distinguished from one another. Parameters corresponding to the distance measurement regions n, the photometric regions k and the light adjustment regions m are denoted by reference designations with the numbers n, k and m at the ends, respectively. The distance measurement regions will be called islands. The light reception quantity of a photometric region k is denoted by the same reference designation as a reference designation BVk representing the photometric region.

Figure 11:
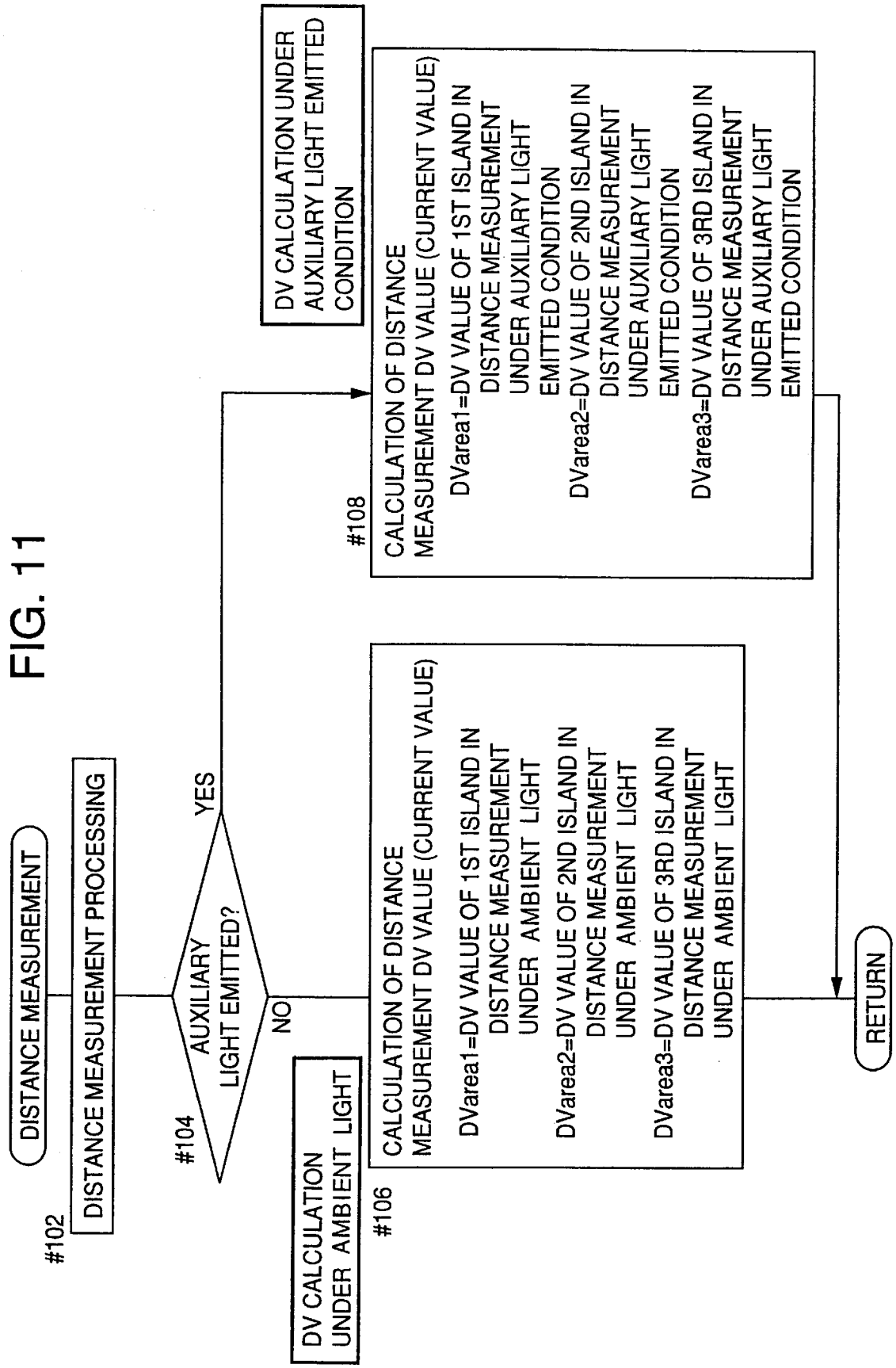
FIG. 11 is a flowchart showing the flow of distance measurement processing.

FIG. 11 shows the flow of the distance measurement processing performed at #6 and #18 of FIGS. 9 and 10. First, distance measurement data is read from the distance measurement module 21 (#102), and whether or not auxiliary light is emitted when the distance measurement data is detected is determined (#104). When auxiliary light is not emitted, that is, in the case of the distance measurement processing performed at #6 of FIGS. 9 and 10, irrespective of the contrast, a detection distance DV of each island n under ambient light is calculated by use of the distance measurement data and the absolute position of the focusing lens 31, and the calculated value is set as a detection distance DVarean of each island n (#106). Since step #106 is performed every time the process reaches #6 of FIGS. 9 and 10, the detection distance DVarean obtained here is always updated to the latest value.

When auxiliary light is emitted, that is, in the case of the distance measurement processing performed at #18 of FIG. 9 and 10, the detection distance DV of each island n under auxiliary light emitted condition is calculated like at #106, and the calculated value is set as the detection distance DVarean of each island n (#108). Since step #108 is performed immediately after in-focus state is obtained, the detection distance DVarean obtained here is a value of immediately after in-focus state is obtained. In order to facilitate handling in the APEX system, as the detection distance DV, the value obtained in the unit of m (meter) is expressed as a logarithm to the base 2.

Figure 12:
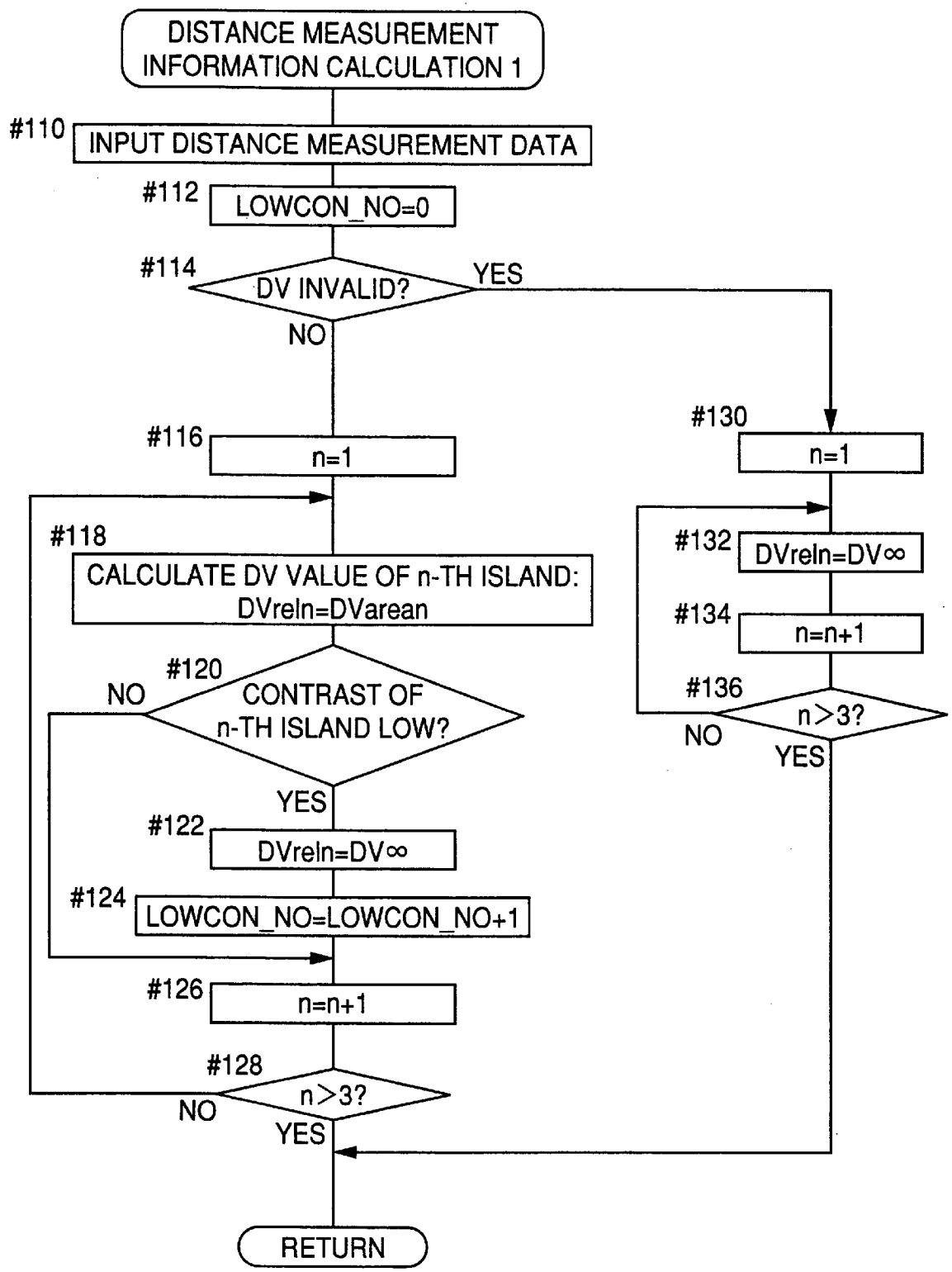
FIG. 12 is a flowchart showing the flow of calculation processing to obtain the latest distance measurement information.

FIG. 12 shows the flow of the calculation processing to obtain distance measurement information performed at #8 of FIGS. 9 and 10. First, the detection distance DVarean calculated at #106 of the distance measurement processing of FIG. 11 is read in (#110), and the flag LOWCON_NO indicating the number of low-contrast distance measurement regions is cleared to 0 (#112). Then, it is determined whether the detection distance DVarean is valid or not (#114).

When the absolute position of the focusing lens 31 is known, since the detection distance DVarean is valid, a detection distance DVreln of each island n is obtained by use of the detection distance DVarean (#116 to #128). Specifically, the detection distance DVreln is decided in the following manner: First, the detection distance DVarean read in at #110 is set as the detection distance DVreln (#118). Then, it is determined whether the contrast of each island n is low or not (#120). When the contrast is low, the detection distance DVreln of the low-contrast island n is replaced by DV∞ which is a DV value corresponding to infinity (#122), and 1 is added to the flag LOWCON_N indicating the number of low-contrast distance measurement regions (#124). The value DV∞ is the maximum value that can be expressed, for example, 255 when it is expressed in one byte.

When the absolute position of the focusing lens 31 is not known, since the object distance DVarean is invalid, the detection distance DVreln is set to a high value for each island n (#130 to #136). That is, the value DV∞ corresponding to infinity is set as the detection distance DVreln of each island n (#132). Since this calculation is performed every time the process reaches #8 of FIGS. 9 and 10, the detection distance DVreln obtained here is always updated to the latest value, and in shooting, the detection distance DVreln is distance measurement information of immediately before shooting.

Figure 13:
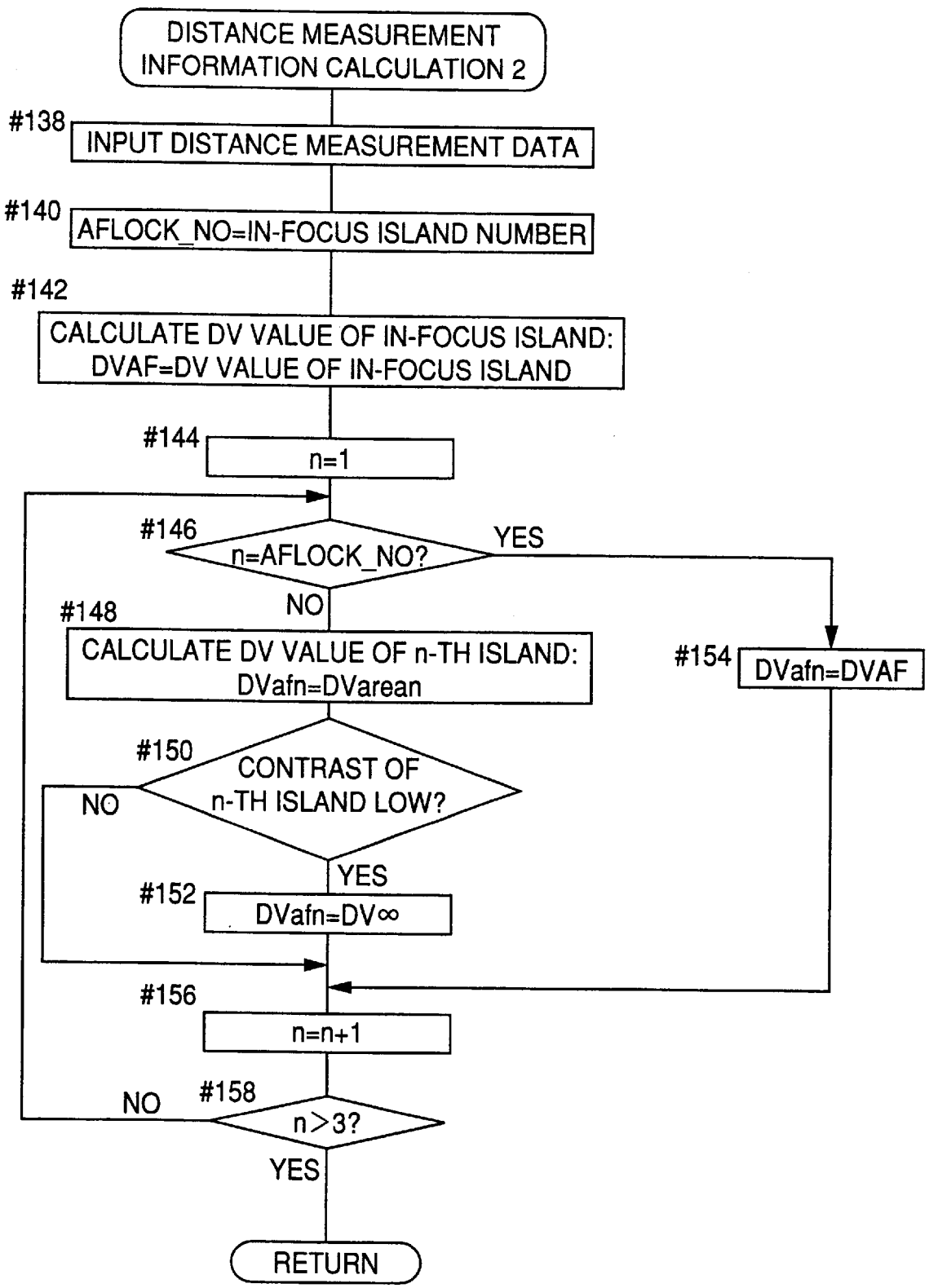
FIG. 13 is a flowchart showing the flow of calculation processing to obtain distance measurement information when in-focus state is locked.

FIG. 13 shows the flow of calculation processing to obtain distance measurement information performed at #20 of FIGS. 9 and 10. First, the detection distance DVarean calculated at #108 of the distance measurement processing of FIG. 11 is read in (#138), and the serial number of the island (in-focus island) used for determining that the taking lens 30 is focused on the subject is set in a flag AFLOCK_NO (#140). Then, the detection distance DV is calculated for the in-focus island, and the calculated detection distance DV is set as a detection distance DVAF of the in-focus island (#142).

Then, a detection distance DVafn is obtained for each island n (#144 to #158). First, the serial number n of the island is compared with the value of the flag AFLOCK_NO to determine whether the island is the in-focus island or not (#146). When the island n is the in-focus island, the already obtained detection distance DVAF is set as the detection distance DVafn of the island (#154).

When the island n is not the in-focus island, the detection distance DVarean read in at #138 is set as the detection distance DVafn (#148). Then, it is determined whether the contrast of the island n is low or not (#150). When the contrast is low, the value of the detection distance DVafn is replaced by the value DV∞ corresponding to infinity (#152).

The detection distance DVafn obtained here is distance measurement information in in-focus state. When the user changes the orientation of the camera or the subject moves so that the composition is changed, the detection distance DVafn does not coincide with the distance measurement information in shooting.

Figure 14:
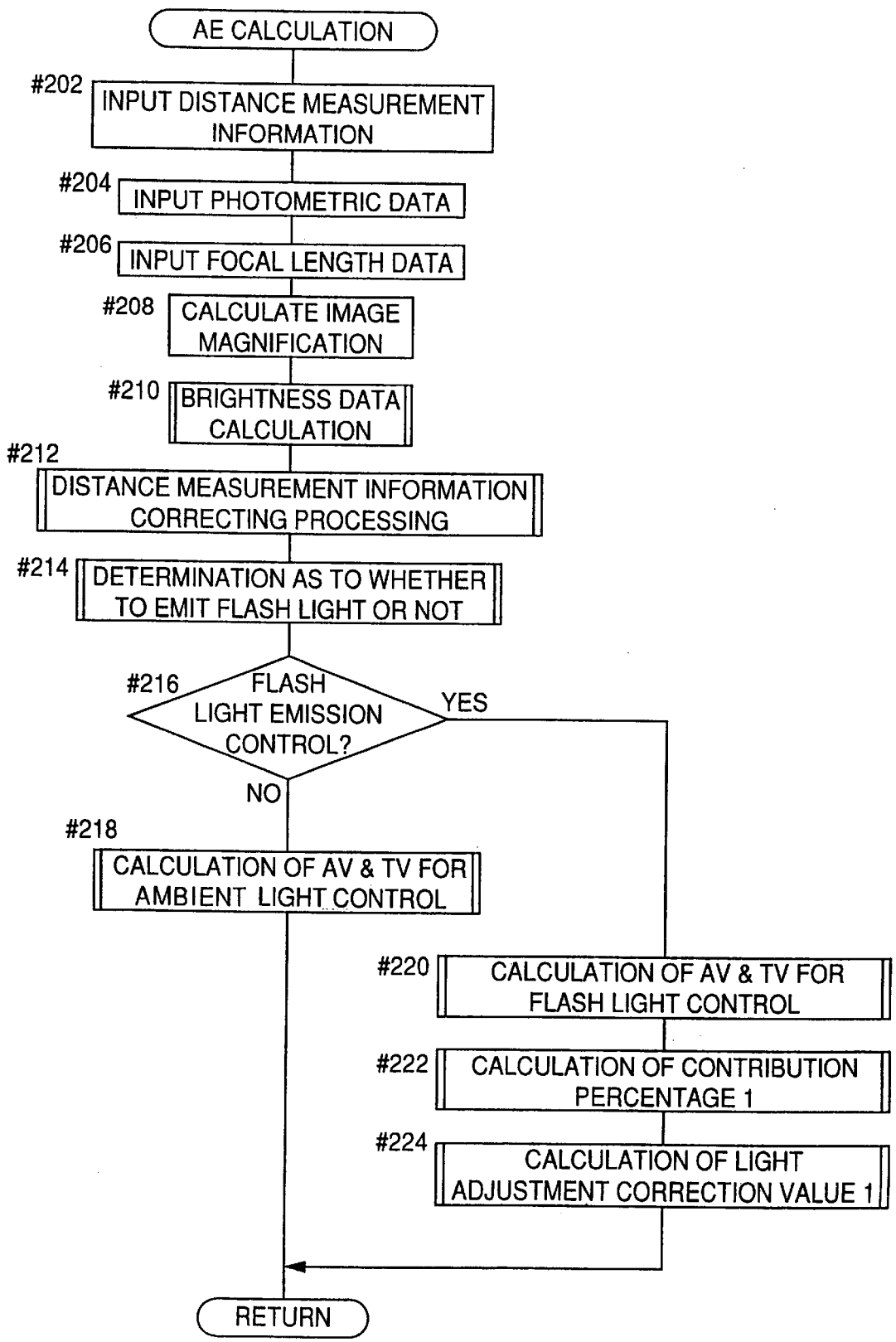
FIG. 14 is a flowchart showing the flow of AE calculation processing associated with exposure control.

FIG. 14 shows the flow of AE calculation processing performed at #28 of FIGS. 9 and 10. First, the distance measurement information obtained at steps #8 and #20, that is, the detection distance DVreln of FIG. 12 and the detection distance DVafn of FIG. 13 are read in (step #202), and the output of the photometric module 22 is read in (#204). Then, the focal length fl of the taking lens 30 of that time is read in (#206) and the image magnification β is calculated (#208). The image magnification β is an approximate ratio, to the focal length fl, of the distance D on which the taking lens 30 is focused.

Then, the brightness BVCm of the part corresponding to each light adjustment region (cell) m of the light adjustment module 23 is obtained from the output of the photometric module 22, and brightness data calculation processing to obtain the brightness BVS of the subject which is a main object to be shot and the brightness BVA of the background is performed in order to use the brightness BVS and the brightness BVA for exposure control and light adjustment control (#210). Then, the distance measurement information in in-focus state and the latest distance measurement information are corrected with reference to the obtained brightness data, and processing to obtain some control parameters is performed (#212).

After the distance measurement information is corrected and the parameters used for the control performed later are calculated, it is determined whether to perform flash shooting or not (step #214). The camera 1 is capable of ambient light shooting in which shooting is performed with only ambient light and flash shooting in which light is emitted from the flash portion 40. Flash shooting includes backlight flash shooting performed when the subject is dark and the background is bright, slow synchro shooting in which the shutter speed is decreased and a subject comparatively dark with ambient light is temporarily made bright while shooting the subject, flash-in-low-light shooting performed when both the subject and the background are dark, and forcible flash shooting in which the user forces light emission. Different exposure controls are performed for these shootings. Although slow synchro shooting is performed on the user's instruction, the backlight flash shooting takes precedence thereover under backlight condition.

At #214, a flash light emission requirement flag indicating whether to emit light or not is set, and which exposure control is selected is determined.

Then, with reference to the value of the flash light emission requirement flag, it is determined whether to emit light or not (#216). When light is not emitted, the aperture value AV and the shutter speed TV used for ambient light shooting are calculated (#218). When light is emitted, the aperture value AV and the shutter speed TV used for flash shooting are calculated in accordance with the selected control (#220), a contribution percentage WTafm of each light adjustment region m used for light adjustment control is calculated based on the distance measurement information (#222), and a light adjustment correction value ΔEVB is calculated based on the distance measurement information (#224).

Figure 15:
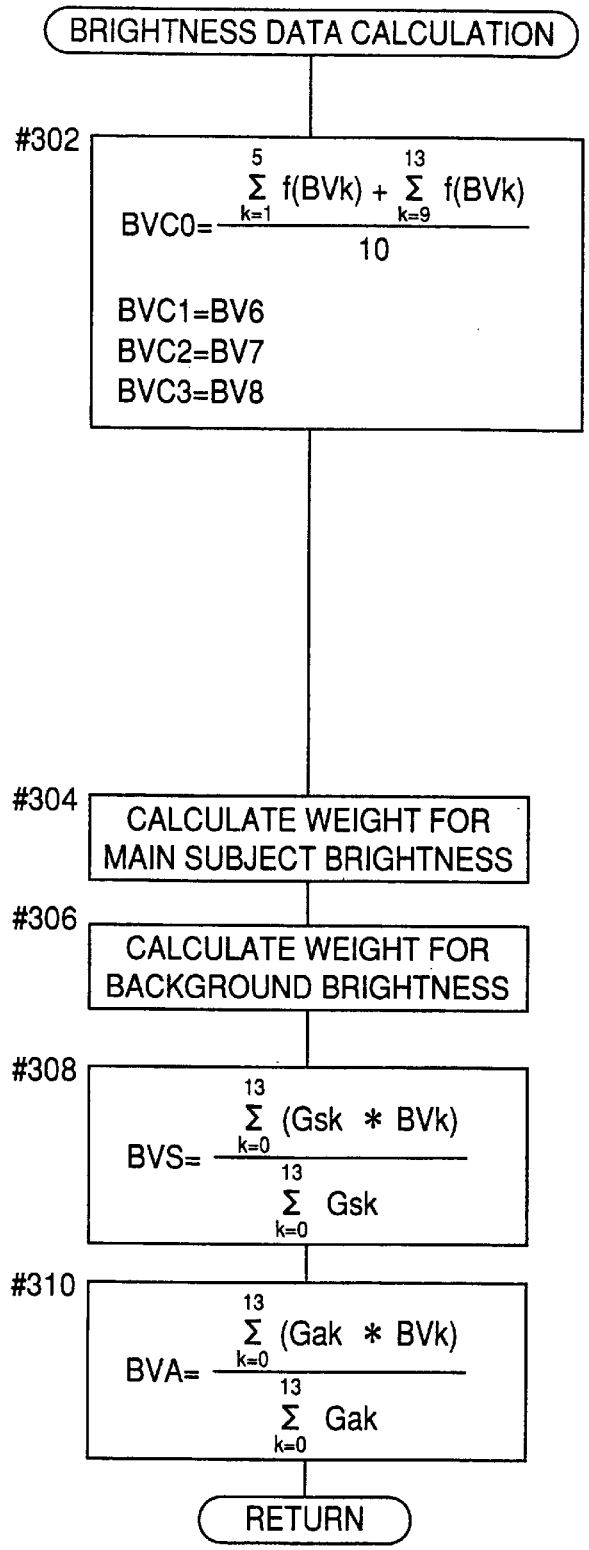
FIG. 15 is a flowchart showing the flow of processing to calculate the brightness of the part corresponding to each light adjustment region, the brightness of the subject and the brightness of the background.

FIG. 15 shows the flow of the brightness data calculation processing performed at step #210 of FIG. 14. First, the brightness BVCm corresponding to each light adjustment region is calculated (#302). Specifically, the brightness BVC0 of the part corresponding to the cell 0 is set to a value obtained by performing, on the light reception quantities of the ten photometric regions BV1 to BV5 and BV9 to BV13 other than the three central regions, a functional processing to obtain the average of the light reception quantities. The brightnesses BVC1 to BVC3 of the parts corresponding to the cells 1 to 3 are set to the light reception quantities of the central photometric regions BV6 to BV8, respectively. The brightnesses BVC1 to BVC3 are also the brightnesses of the islands 1 to 3. In order to facilitate handling in the APEX system, the light reception quantities and the brightnesses are expressed as logarithms to the base 2.

The brightness BVC0 may be obtained by any of the logarithmic average, the exponential average and the inverse exponential average. The function f(BVk) to obtain the average is, for example, f(BVk)=BVk in the case of the most simple logarithmic average.

Then, the brightness BVS of the subject and the brightness BVA of the background are calculated (#304 to #310). The brightnesses BVS and BVA are obtained as weighted averages of the values obtained by assigning weights to the light reception quantities BVk of the photometric regions. As the weights, two kinds, one for the subject and the other for the background, are used. First, a weight Gsk for the subject and a weight Gak for the background are set for each photometric region (steps #304 and #306).

Then, for all the fourteen photometric regions, the light reception quantity BVk is multiplied by the weight Gsk for the subject, and the sum total thereof is obtained. Then, the obtained sum total is divided by the sum total of the weights Gsk and the result is set as the subject brightness BVS (#308). Similarly, for all the fourteen photometric regions, the light reception quantity BVk is multiplied by the weight Gak for the background, and the sum total thereof is obtained. Then, the obtained sum total is divided by the sum total of the weights Gak and the result is set as the background brightness BVA (#310).

Figure 16:
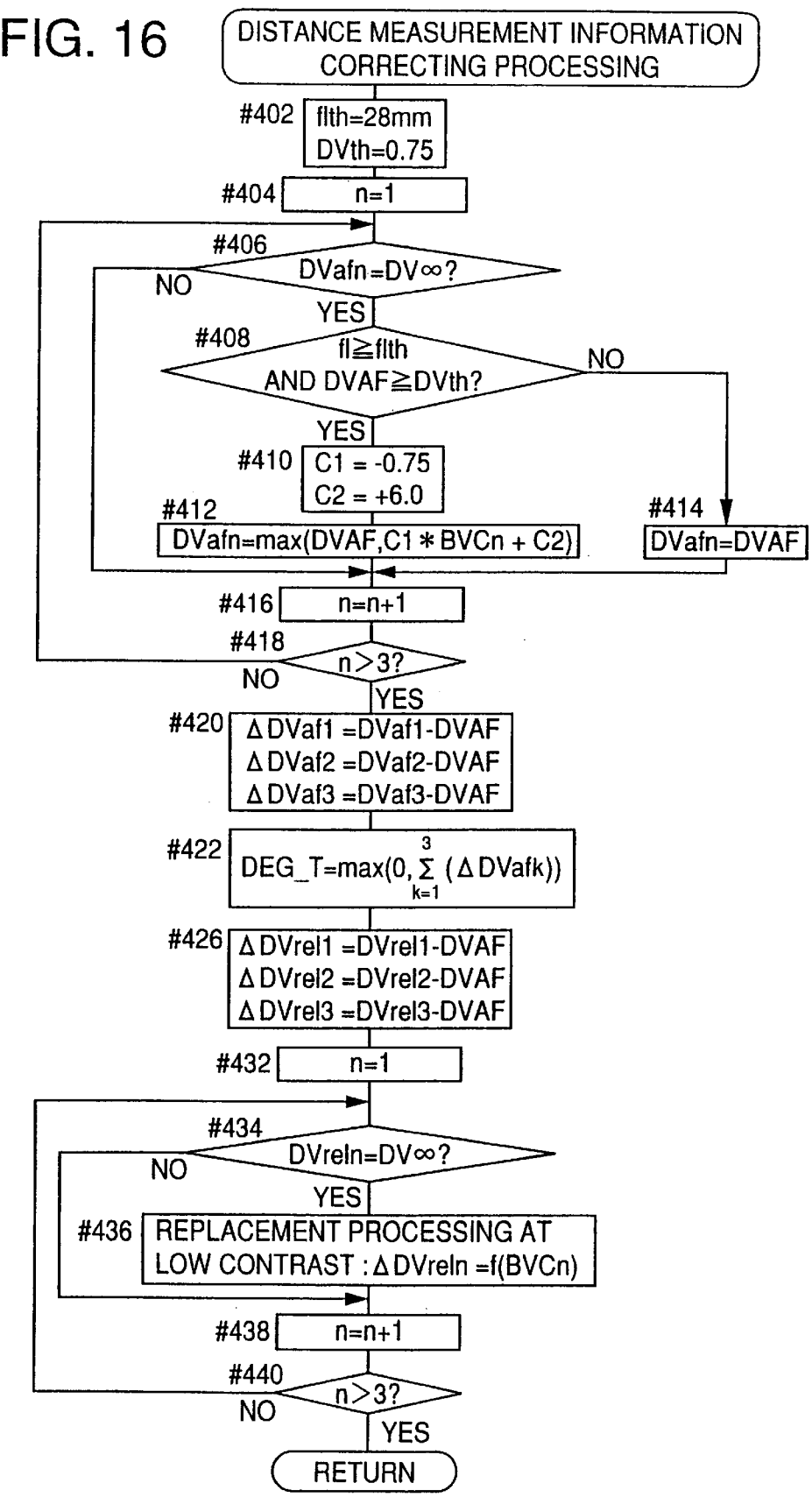
FIG. 16 is a flowchart showing the flow of the processing of distance measurement information correction and control parameter calculation.

FIG. 16 shows the flow of the processing of distance measurement information correction and control parameter calculation performed at step #212 of FIG. 14. First, the detection distance DVafn of each island n in in-focus state is corrected (steps #404 to #418). This correction is performed only for the islands the contrast of which is low when in-focus state is obtained. To perform the correction in accordance with whether the shooting angle of view is larger than a predetermined value or not and whether the distance to the subject is shorter than a predetermined distance, a threshold value is set for each of the focal length and the detection distance (step #402). Specifically, the threshold value flth of the focal length is set to 28 mm, and the threshold value DVth of the detection distance is set to 0.75.

Then, it is determined whether the detection distance DVafn is the value DV∞ or not (#406). When the result of the determination is false, the correction is not performed. When the result of the determination is true, that is, when the contrast of an island n is low when in-focus state is obtained, it is determined whether or not the focal length fl is equal to or greater than the threshold value flth and whether or not the detection distance DVAF of the in-focus island is equal to or greater than the threshold value DVth (#408). When the result of the determination is false, that is, when the shooting angle of view is wide or the distance to the subject is short, the detection distance DVafn is replaced by the detection distance DVAF of the in-focus island (#414).

When the result of the determination of #408 is true, that is, when the shooting angle of view is narrow and the distance to the subject is not short, two constants C1 and C2 are set (#410), the greater one of the value obtained by multiplying the brightness BVCn of the photometric region corresponding to the island by the constant C1 and adding the constant C2 to the result of the multiplication, and the detection distance DVAF of the in-focus island is set as the detection distance DVafn. Specifically, the constants C1 and C2 are −0.75 and 0.6, respectively.

After the correction of the detection distance DVafn in in-focus state, the detection distance DVAF of the in-focus island is subtracted from the detection distance DVafn of each island n in in-focus state to thereby obtain a detection distance difference ΔDVafn (#420), and the sum of three detection distance differences ΔDVafn is set as a background remoteness degree DEG_T indicating how far the background is from the subject (#422). When the sum of the detection distance differences ΔDVafn is a negative value, the background remoteness degree DEG_T is set to 0.

Moreover, the detection distance DVAF of the in-focus island in in-focus state is subtracted from the latest detection distance DVreln of each island n to thereby obtain a detection distance difference ΔDVreln (#426). Then, the latest detection distance difference ΔDVreln of each island n is replaced (#432 to #440). This replacement is performed only for low-contrast islands. First, it is determined whether the detection distance DVreln is the value DV∞ or not (#434). When the result of the determination is false, the correction is not performed. When the result of the determination is true, a value obtained by performing a functional processing on the brightness BVCn of the part corresponding to the island is set as the detection distance difference ΔDVreln (#436). The function f(BVCn) is, for example, f(BVCn)= BVCn−BVS.

Figure 17:
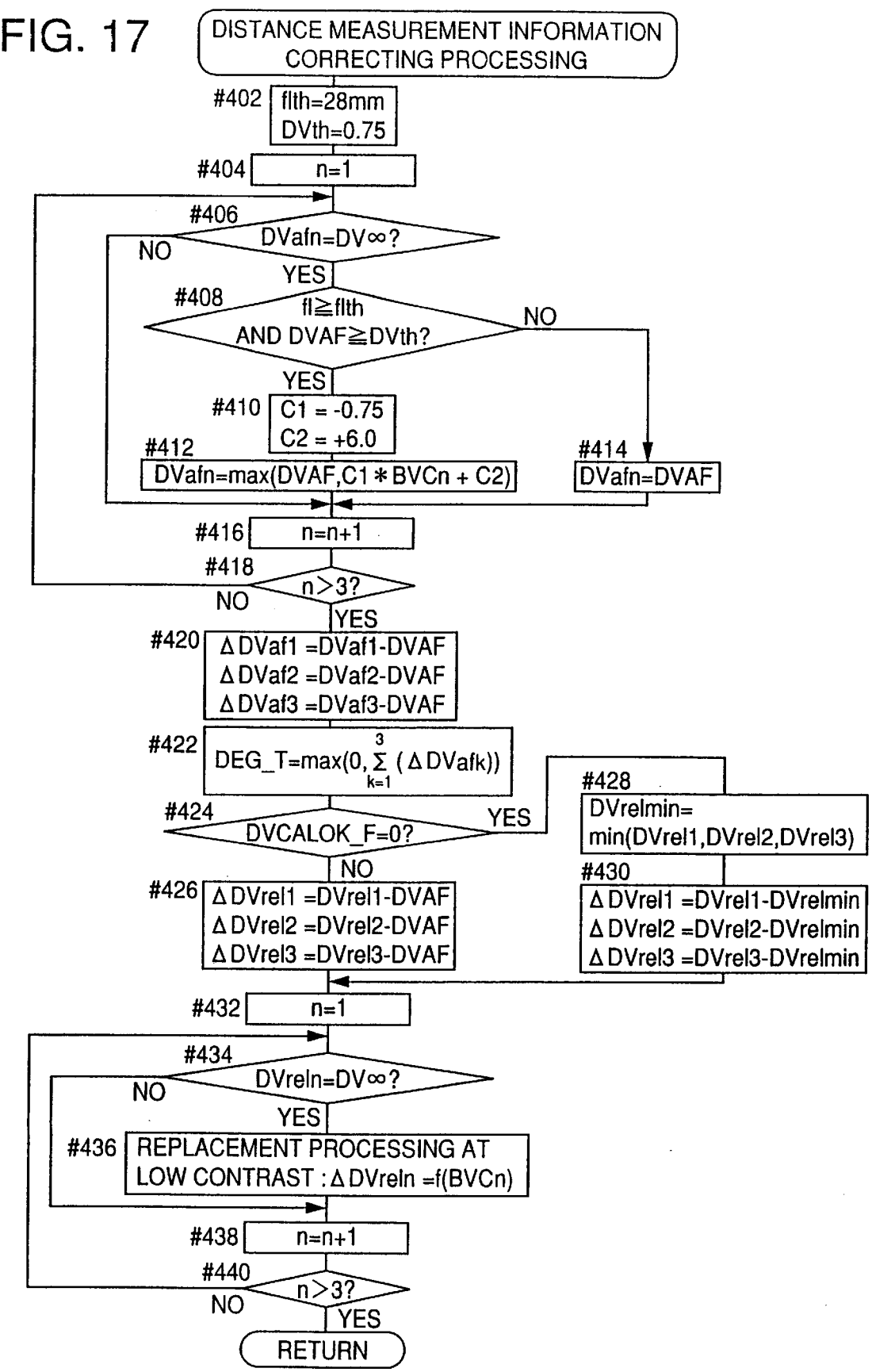
FIG. 17 is a flowchart showing the flow of another processing of distance measurement information correction and control parameter calculation.

The flow of the processing of the distance measurement information correction and the control parameter calculation performed at #212 of FIG. 13 may be the flow shown in FIG. 17 instead of the flow shown in FIG. 16. The processing of FIG. 17 is different from that of FIG. 16 in that steps #424 to #430 are present.

In the processing of FIG. 17, after the background remoteness degree DEG_T is calculated (#420), the value of the flag DVCALOK_F is checked to thereby determine whether the calculation of the detection distance DVafn in in-focus state is completed or not (#424). When the calculation is completed, a processing similar to that of FIG. 16 is performed from #426. When the calculation is not completed, first, the minimum value of the latest detection distances DVreln is set as a minimum detection distance DVrelmin (#428). Then, the minimum detection distance DVrelmin is subtracted from the latest detection distance Dvreln to thereby obtain the detection distance difference ΔDVreln (#430).

Then, like the processing of FIG. 16, the latest detection distance difference ΔDVreln of each island n is replaced (#432 to #440). When it is determined at #424 that the calculation of the detection distance DVafn of each island n in in-focus state is not completed, the background remoteness degree DEG_T calculated based on this value at #422 is inaccurate. Therefore, in such a case, the background remoteness degree DEG_T is not used in the succeeding processing. Except this, the processing of FIG. 17 is the same as that of FIG. 16. Therefore, no overlapping description will be given.

Figure 18:
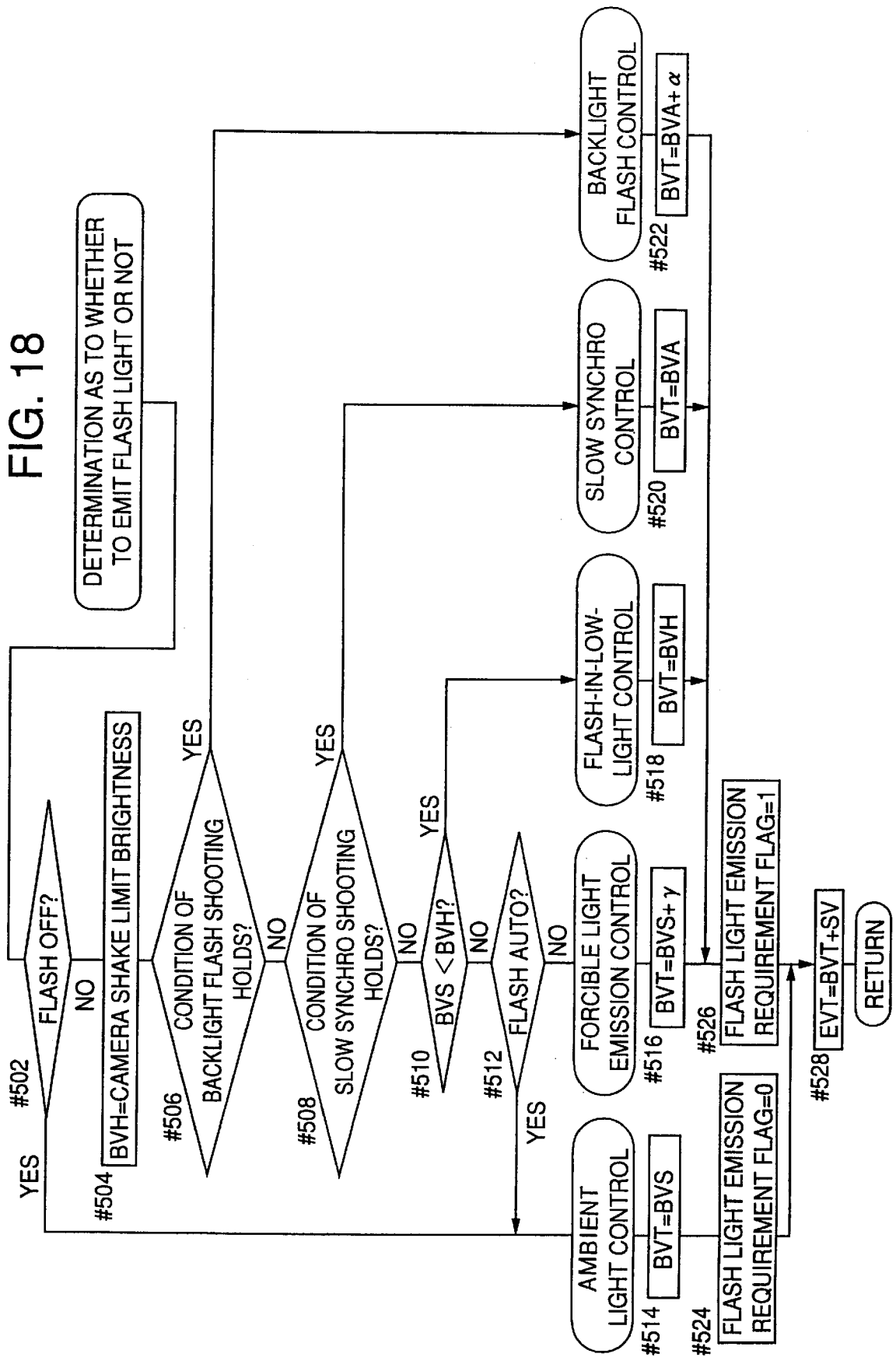
FIG. 18 is a flowchart showing the flow of the processing to determine whether to perform flash shooting or not and to select the exposure control.

FIG. 18 shows the flow of the processing of determination as to whether to perform flash shooting or not and selection of the exposure control performed at step #214 of FIG. 14. First, it is determined whether the flash control module 41 is connected or not (#502). When the flash control module 41 is not connected, since the power of the flash portion 40 is not ON, ambient light control is performed. In the ambient light control, the subject brightness BVS is set as a control brightness BVT (#514), and the flash light emission requirement flag indicating whether to emit flash light or not is set to 0 (#524).

When the flash control module 41 is connected, that is, the power of the flash portion 40 is ON, first, a predetermined value is set as a camera shake limit brightness BVH (#504). Then, the following determinations are made: whether the condition of the backlight flash shooting holds or not (#506); whether the condition of the slow synchro shooting holds or not (#508); and whether a condition that the subject brightness BVS is lower than the camera shake limit brightness BVH holds or not (#510).

When the condition of the backlight shooting holds, backlight flash control is performed. In the backlight flash control, a value obtained by adding a predetermined correction amount a to the background brightness BVA is set as the control brightness BVT (#522). When the user specifies the slow synchro shooting, it is determined that the condition of the slow synchro shooting holds, and slow synchro control is performed. In the slow synchro control, the background brightness BVA is set as the control brightness BVT (#520). When the subject brightness BVS is lower than the camera shake limit brightness BVH, flash-in-low-light control is performed. In the flash-in-low-light control, the camera shake limit brightness BVH is set as the control brightness BVT (#518).

When none of the above-mentioned conditions holds, it is determined whether the control mode of the flash portion 40 is set to an automatic light emission control mode or not (#512). The control mode of the flash portion 40 is specified by the user. Either the automatic flash light emission control mode or a forcible light emission control mode is specified. In the automatic light emission control mode, whether to emit flash light or not is automatically selected according to the shooting condition. In the forcible light emission control mode, flash light is emitted irrespective of the shooting condition.

When it is determined at step #512 that the automatic light emission control mode is specified, it is determined that it is unnecessary to emit flash light, and the ambient light control is performed. That is, the subject brightness BVS is set as the control brightness BVT (#514). When the forcible light emission control mode is specified, a value obtained by adding a predetermined correction amount γ to the subject brightness BVS is set as the control brightness BVS (#516). Hereinafter, the forcible light emission control, the flash-in-low-light control, the slow synchro control and the backlight flash control will together be referred to as flash light control. In the flash light control, the flash light emission requirement flag is set to 1 (#526).

A value obtained by adding the film speed SV to the control brightness BVT obtained as described above is set as a control exposure EVT (#528). The film speed SV is a value previously read in when the film is loaded.

Figure 19:
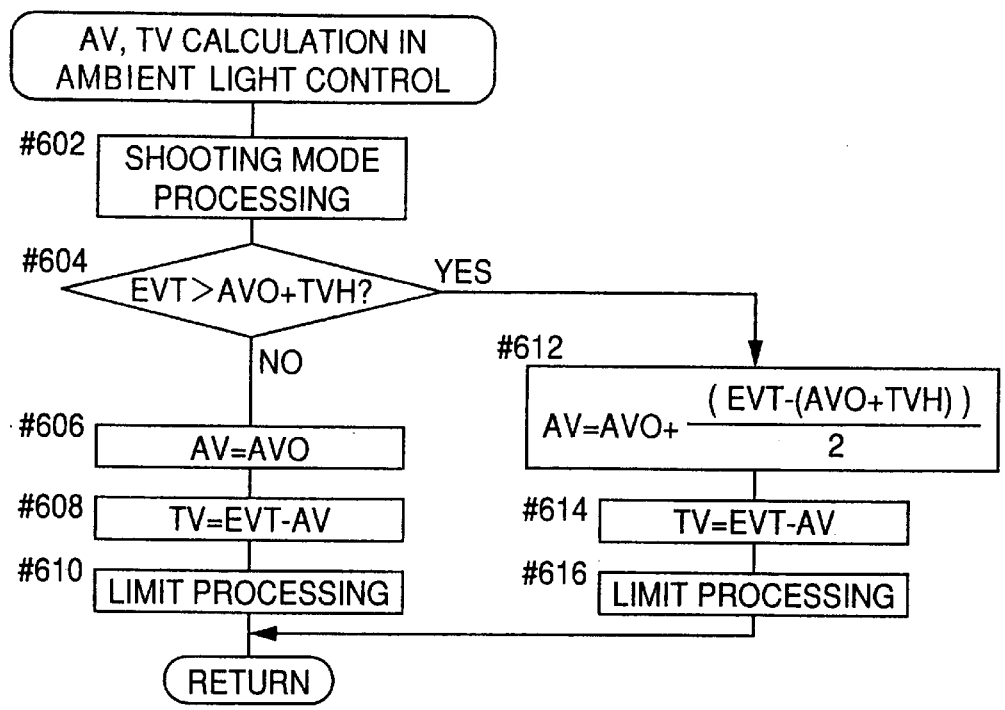
FIG. 19 is a flowchart showing the flow of the processing to calculate the aperture value and the shutter speed in ambient light shooting.

FIG. 19 shows the flow of the processing to calculate the aperture value AV and the shutter speed TV in the ambient light control performed at #218 of FIG. 14. First, which exposure control mode is specified is read in (#602). When any one of the shutter priority mode, the aperture priority mode and the manual mode is specified, the aperture value AV and the shutter speed TV are set in accordance with the specified values.

When the program mode is specified, it is determined whether the control exposure EVT calculated at step #528 of FIG. 18 is higher than a value obtained by adding the camera shake limit shutter speed TVH to a full aperture value AV0 or not. When the control exposure EVT is not higher, the full aperture value AV0 is set as the aperture value AV (#606) and a value obtained by subtracting the aperture value AV from the control exposure EVT is set as the shutter speed TV (#608). When the calculated shutter speed TV is slower than a minimum shutter speed TVmin, a limit processing to set the minimum shutter speed TVmin as the shutter speed TV is performed (#610).

When the control exposure EVT is higher than the value obtained by adding the camera shake limit shutter speed TVH to the full aperture value AV0, the aperture value AV is set to AV=AV0+(EVT−(AV0+TVH))/2 (#612). Then, a value obtained by subtracting the aperture value AV from the control exposure EVT is set as the shutter speed TV (#614). When the aperture value AV is higher than a minimum aperture value AVmax, a limit processing is performed where the minimum aperture value AVmax is set as the aperture value AV, and a value obtained by subtracting the minimum aperture value AVmax from the control exposure EVT is set as the shutter speed TV (#616). When the shutter speed TV is higher than a maximum shutter speed TVmax, a limit processing to set the maximum shutter speed TVmax as the shutter speed TV is performed (#616).

Figure 20:
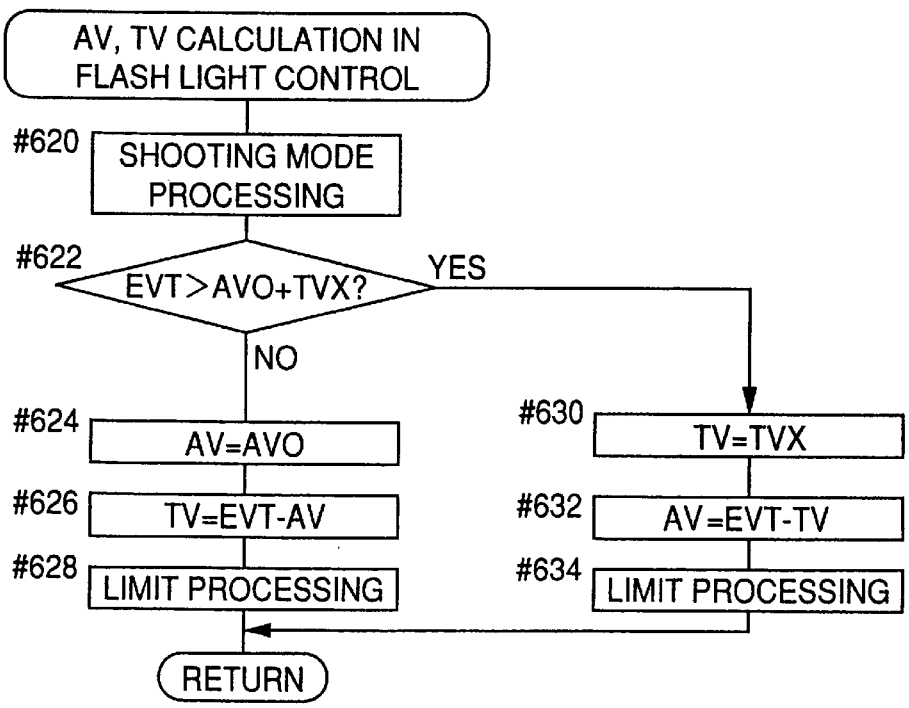
FIG. 20 is a flowchart showing the flow of the processing to calculate the aperture value and the shutter speed in flash shooting.

FIG. 20 shows the flow of the processing to calculate the aperture value AV and the shutter speed TV in flash light control performed at #220 of FIG. 14. First, which exposure control mode is specified is read (#620). When any one of the shutter priority mode, the aperture priority mode and the manual mode is specified, the aperture value AV and the shutter speed TV are set in accordance with the specified value.

When the program mode is specified, it is determined whether or not the control exposure EVT calculated at step #528 of FIG. 18 is higher than a value obtained by adding a synchronization speed TVH to the full aperture value AV0 (#622). In the program mode in the flash light control, in order that the emitted flash light is uniformly applied, flash light is emitted when the shutter is fully opened. The shutter speed at the limit where the emitted flash light is uniformly applied is set as a synchronization speed TVX. The flash light is uniformly applied when the shutter speed TV is equal to or lower than the synchronization speed TVX.

When the control exposure EVT is not higher than the value obtained by adding the synchronization speed TVH to the full aperture value AV0, the full aperture value AV0 is set as the aperture value AV (#624), and a value obtained by subtracting the aperture value AV from the control exposure EVT is set as the shutter speed TV (#626). When the shutter speed TV is lower than the minimum shutter speed TVmin, a limit processing to set the minimum shutter speed TVmin as the shutter speed TV is performed (#628).

When the control exposure EVT is higher than a value obtained by adding the synchronization speed TVX to the full aperture value AV0, the synchronization speed TVX is set as the shutter speed TV (#630), and a value obtained by subtracting the shutter speed TV from the control exposure EVT is set as the aperture value AV (#632). When the aperture value AV is higher than the minimum aperture value AVmax, a limit processing to set the minimum aperture value AVmax to the aperture value AV is performed (#634).

Figure 21:
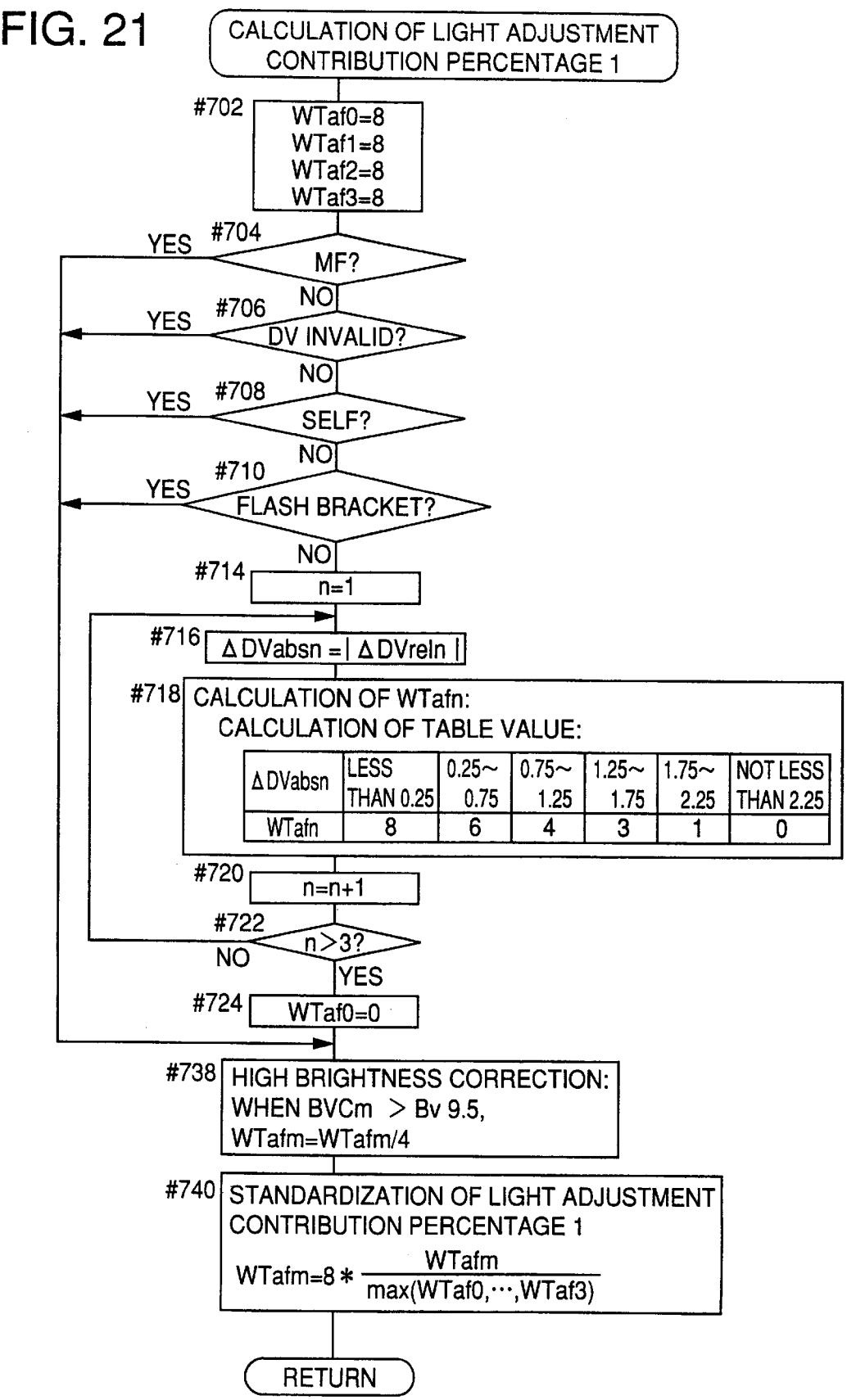
FIG. 21 is a flowchart showing the flow of the processing to calculate the contribution percentages of light adjustment regions based on distance measurement information.

FIG. 21 shows the flow of the processing to calculate the contribution percentage WTafm of each light adjustment region (cell) m performed at step #222 of FIG. 14. The contribution percentage of a light adjustment region m corresponding to a distance measurement region n (m=n) is designated as WTafn. In shooting under normal conditions, the contribution percentage WTafm is calculated based on the absolute value ΔDVabsn of the latest detection distance difference ΔDVreln of each distance measurement region n. However, under specific conditions, there are cases where it is desirable that the contribution percentage WTafm be fixed. Therefore, first, the contribution percentages WTaf0 to WTaf3 of four light adjustment regions 0 to 3 are all set to the same value 8 (step #702).

Then, it is determined whether specific conditions apply or not (#704 to #710). Specifically, the following determinations are made: whether manual focusing is set or not (#704); whether the detection distance DV is invalid or not (#706); whether the self timer shooting is set or not (#708); and whether the flash bracket shooting is set or not (#710). When the result of any one of these determinations is true, the process proceeds to #738 in order that the value set at #702 is set as the contribution percentage WTafm as it is.

This is for the following reasons: In manual focusing, there is no guarantee that the taking lens is focused on the subject and the reliability of the detection distance ΔDVreln is low. The self timer shooting is usually performed when the ambient light is insufficient, and the reliability of the detection distance difference ΔDVreln is frequently low. In the flash bracket shooting, a plurality of frames are exposed while changing the light emission quantity, and the aim of the shooting is more easily attained when the contribution percentage is not changed.

Another reason is that the reliability of the detection distance difference ΔDVreln decreases also when the detection distance DV is invalid.

When the results of the determinations of #704 to #710 are all false, the absolute value of the latest detection distance difference ΔDVreln is set as the detection distance difference ΔDVabsn, and the contribution percentage WTafn of the light adjustment region corresponding to the distance measurement region n is calculated based on the detection distance difference ΔDVabsn (#714 to #722). Here, the detection distance difference ΔDVabsn is classified into six steps and the contribution percentage WTafn is set for each step.

Specifically, as the contribution percentage WTafn, 8 is set when the detection distance difference ΔDvabsn is less than 0.25, 6 is set when the detection distance difference ΔDvabsn is 0.25 to 0.75, 4 is set when the detection distance difference ΔDvabsn is 0.75 to 1.25, 3 is set when the detection distance difference ΔDvabsn is 1.25 to 1.75, 1 is set when the detection distance difference ΔDVabsn is 1.75 to 2.25, and 0 is set when the detection distance difference ΔDVabsn is equal to or greater than 2.25 (#718). As the contribution percentage WTaf0, 0 is set (#724).

Then, with reference to the four brightnesses BVC0 to BVC3 obtained in FIG. 15, the contribution percentage WTafm is corrected for light adjustment regions in which the ambient light brightness is high (#738). Specifically, when the brightness BVCm exceeds 9.5, the contribution percentage WTafm set at #718 or the contribution percentage WTafm calculated at #738 is reduced to one-fourth. Owing to this setting, even when an extremely bright object such as a light source is present in a part of the shooting range, light adjustment control with little effect of the bright object can be performed.

Lastly, the contribution percentage WTafm of each light adjustment region m is standardized (#740). The standardization is performed by dividing the contribution percentage WTafm of each light adjustment region m by the maximum value of the four contribution percentages WTaf0 to WTaf3, and multiplying the result by 8.

Figure 22:
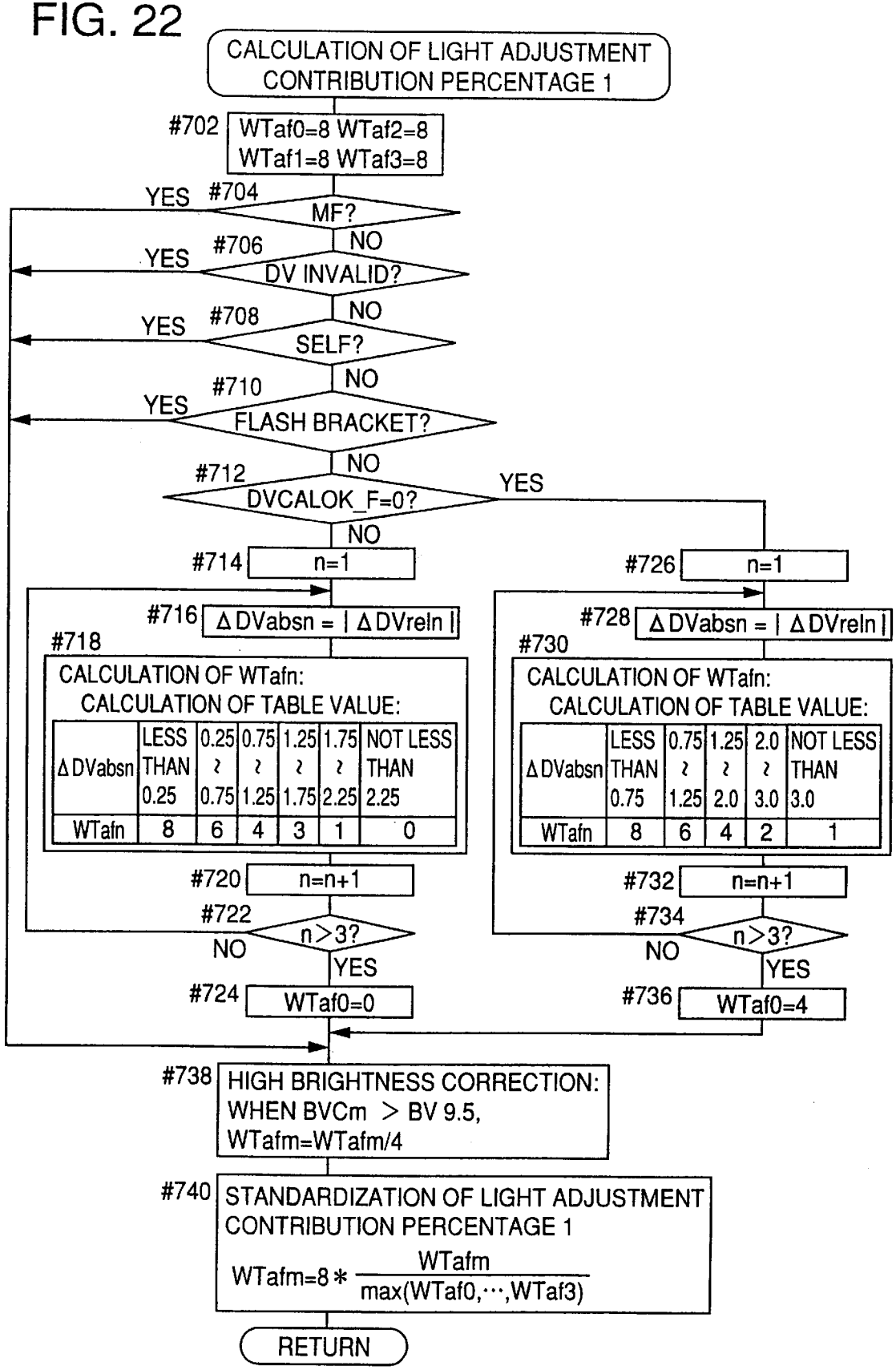
FIG. 22 is a flowchart showing the flow of another processing to calculate the contribution percentages of the light adjustment regions based on distance measurement information.

In the processing of the distance measurement information correction and control parameter calculation performed at #212 of FIG. 14, when the processing is performed in accordance with the flow shown in FIG. 17, the processing to calculate the contribution percentage WTafm of each light adjustment region (cell) m at step #222 of FIG. 14 is performed in accordance with the flow shown in FIG. 22 instead of the flow shown in FIG. 21.

The processing shown in FIG. 22 is different from that shown in FIG. 21 in that steps #712 and #726 to #736 are present. In this processing, it is determined whether the calculation of the detection distances DVafn of all the distance measurement regions in in-focus state is completed or not (#712). When it is determined that the calculation is not completed, instead of performing steps #714 to #724, the absolute value of the latest detection distance ΔDVreln is set as the detection distance difference ΔDVabsn and the contribution percentage WTafn of the light adjustment region corresponding to the distance measurement region n is calculated based on the detection distance difference ΔDVabsn (#726 to #736). The latest detection distance difference ΔDVreln used here is the one calculated at #430 of FIG. 17. Here, the detection distance difference ΔDVabsn is classified into five steps, and the contribution percentage WTafn is set for each step.

Specifically, as the light adjustment contribution percentage WTafn, 8 is set when the detection distance difference ΔDVabsn is less than 0.75, 6 is set when the detection distance difference ΔDVabsn is 0.75 to 1.25, 4 is set when the detection distance difference ΔDVabsn is 1.25 to 2.0, 2 is set when the detection distance difference ΔDVabsn is 2.0 to 3.0, and 1 is set when the detection distance difference ΔDVabsn is equal to or greater than 3.0 (#730). As the light adjustment contribution percentage WTaf0, 4 is set (#736).

When the above-described processing is completed, the process proceeds to #738. In other respects, the processing of FIG. 22 is the same as that of FIG. 21. Therefore, no overlapping description will be given.

Figure 23:
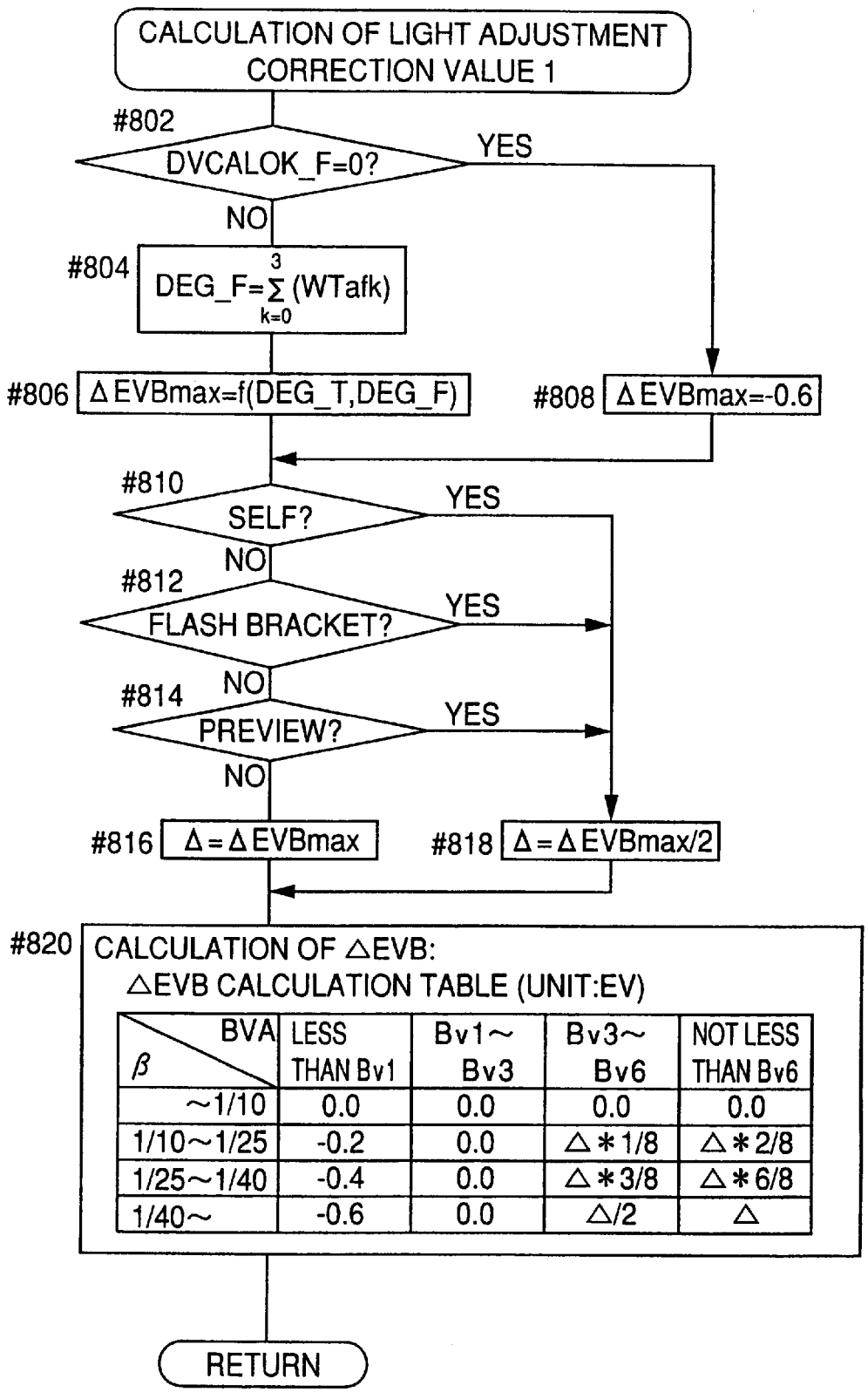
FIG. 23 is a flowchart showing the flow of the processing to calculate a light adjustment correction value based on distance measurement information.

FIG. 23 shows the flow of the processing to calculate the light adjustment correction value ΔEVB performed at step #224 of FIG. 14. The correction value ΔEVB is expressed as an APEX value. First, the value of the flag DVCALOK_F is checked to thereby determine whether the distance measurement information in in-focus state is calculated for each distance measurement region n or not (#802), and in accordance with the result of the determination, a maximum value ΔEVBmax of the light adjustment correction value ΔEVB is obtained (steps #804 to #808).

When the calculation of the distance measurement information in in-focus state locked condition is completed, the sum of the contribution percentages WTafn calculated in FIGS. 21 and 22 is set as a contribution percentage average degree DEG_F (#804), and a value obtained by performing a functional processing on the background remoteness degree DEG_T and the contribution percentage average degree DEG_F is set as the maximum value ΔEVBmax (#806). In the functional processing, for example, a value obtained by multiplying DEG_T by DEG_F is multiplied by a constant C3, and to the result of this multiplication, a constant C4 is added. Here, the constants C3 and C4 are, for example, −0.1 and 0, respectively. When the calculation of the distance measurement information in in-focus state is not completed, −0.6 is set as the maximum value ΔEVBmax (#808).

Then, the following determinations are made: whether the self timer shooting is set or not (#810); whether the flash bracket shooting is set or not (#812); and whether preview state is set or not, that is, whether the diaphragm 37 is stopped down or not (#814).

When the results of the determinations of #810 to #814 are all false, the maximum value ΔEVBmax of the light adjustment correction value ΔEVB is set as a value A used at the next step #820 (#816). When the result of any of the determinations of #810 to #814 is true, ½ of the maximum value ΔEVBmax is set as the value A (#818). This is done in order to avoid overcorrection when the above-mentioned condition is satisfied.

Then, the correction value ΔEVB is obtained based on the image magnification β and the background brightness BVA (#820). Here, the image magnification β is classified into four steps of not less than 1/10, 1/10 to 1/25, 1/25 to 1/40 and not more than 1/40 and the background brightness BVA is classified into four steps of less than Bv value 1, 1 to 3, 3 to 6 and not less than 6. The correction value ΔEVB is set for each step.

Specifically, when the image magnification β is equal to or greater than 1/10, the correction value ΔEVB is 0 irrespective of the background brightness BVA, and when the background brightness BVA is Bv1 to Bv3, the correction value ΔEVB is 0 irrespective of the image magnification β. When the background brightness BVA is less than Bv1, the correction value ΔEVB is changed from 0.0 to −0.6 in steps of 0.2 as the image magnification β decreases. When the background brightness BVA is equal to or greater than Bv6, in accordance with the steps of the image magnification β of 1/10 to 1/25, 1/25 to 1/40 and not more than 1/40, the correction value ΔEVB is Δ.⅜, Δ.⅝ and Δ. When the background brightness BVA is Bv3 to Bv6, the correction value ΔEVB is ½ of the correction value ΔEVB used when the background brightness BVA is equal to or greater than Bv6.

Figure 24:
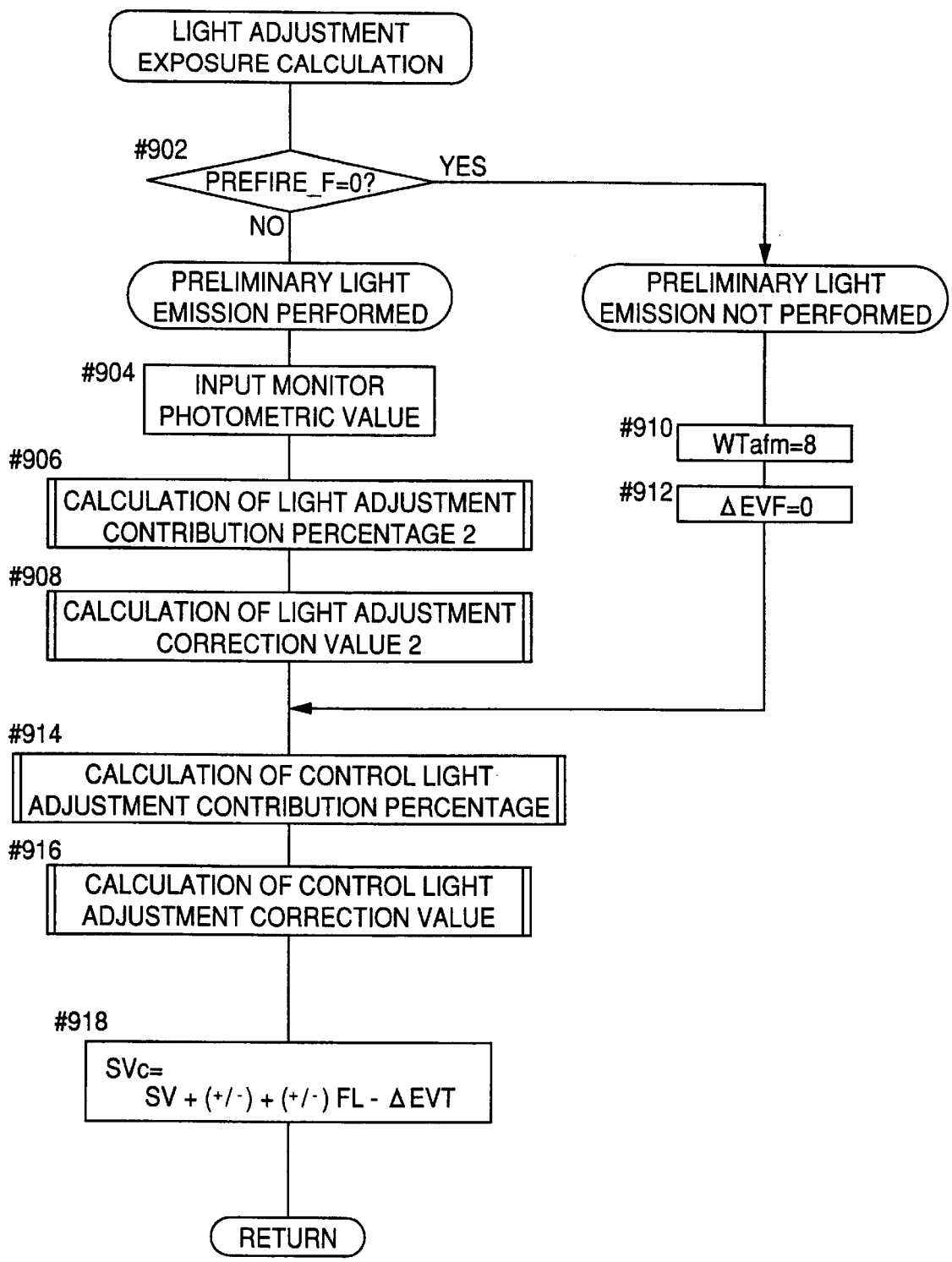
FIG. 24 is a flowchart showing the flow of the processing to calculate light adjustment exposure.

FIG. 24 shows the flow of light adjustment exposure calculation processing performed at #46 of FIGS. 9 and 10. First, whether preliminary light emission is performed or not is determined by checking the value set in the preliminary light emission completion flag PREFIRE_F (#902). When 1 is set in the preliminary light emission completion flag PREFIRE_F, since preliminary light emission is performed, photometric data obtained by the photometric module 22 in preliminary light emission is read in (#904). Then, for use in light adjustment control, a contribution percentage WTflm of each light adjustment region m is calculated based on the distance measurement information and the photometric data read in at #904 (#906), and a light adjustment correction value ΔEVF is calculated based on the photometric data, the background brightness BVA and the image magnification β (#908).

When 0 is set in the preliminary light emission completion flag PREFIRE_F, since preliminary light emission is not performed, there is no new information, and the contribution percentages WTaf0 to WTaf3 are all set to the same value 8 (step #910). Then, the light adjustment correction value ΔEVF is set to 0 (#912).

Then, for all the light adjustment regions 0 to 3, a control light adjustment contribution percentage WTtm is calculated by use of the contribution percentage WTafm based on the distance measurement information and the WTflm based on the photometric information and the distance measurement information of the preliminary light emission (#914), and the control light adjustment correction value ΔEVT is calculated by use of the light adjustment correction value ΔEVB based on the distance measurement information and the light adjustment correction value AEVF based on the photometric information, etc. in preliminary light emission (#916).

The calculated control light adjustment contribution percentage WTtm is used for controlling the flash light emission quantity in the real flash light emission performed at #56 of FIGS. 9 and 10. Specifically, the reflected light quantity is received in each light adjustment region of the light adjustment element 23a when the flash light is emitted, and the flash light emission is stopped when the sum total of the light reception quantities reaches a predetermined value. Here, the control light adjustment contribution percentage WTtm is used as the contribution percentage of each light adjustment region m used when the sum total of the light reception quantities is obtained.

The calculated control light adjustment correction value ΔEVT is used for calculating a control value SVc of the speed of the film F in flash shooting. Specifically, to obtain the control value SVc, an exposure correction value (+/−) and a light adjustment correction value (+/−)FL specified by the user are added to a true speed SV of the film F, and the control light adjustment correction value ΔEVT is subtracted from the result of the addition (#918).

Figure 25:
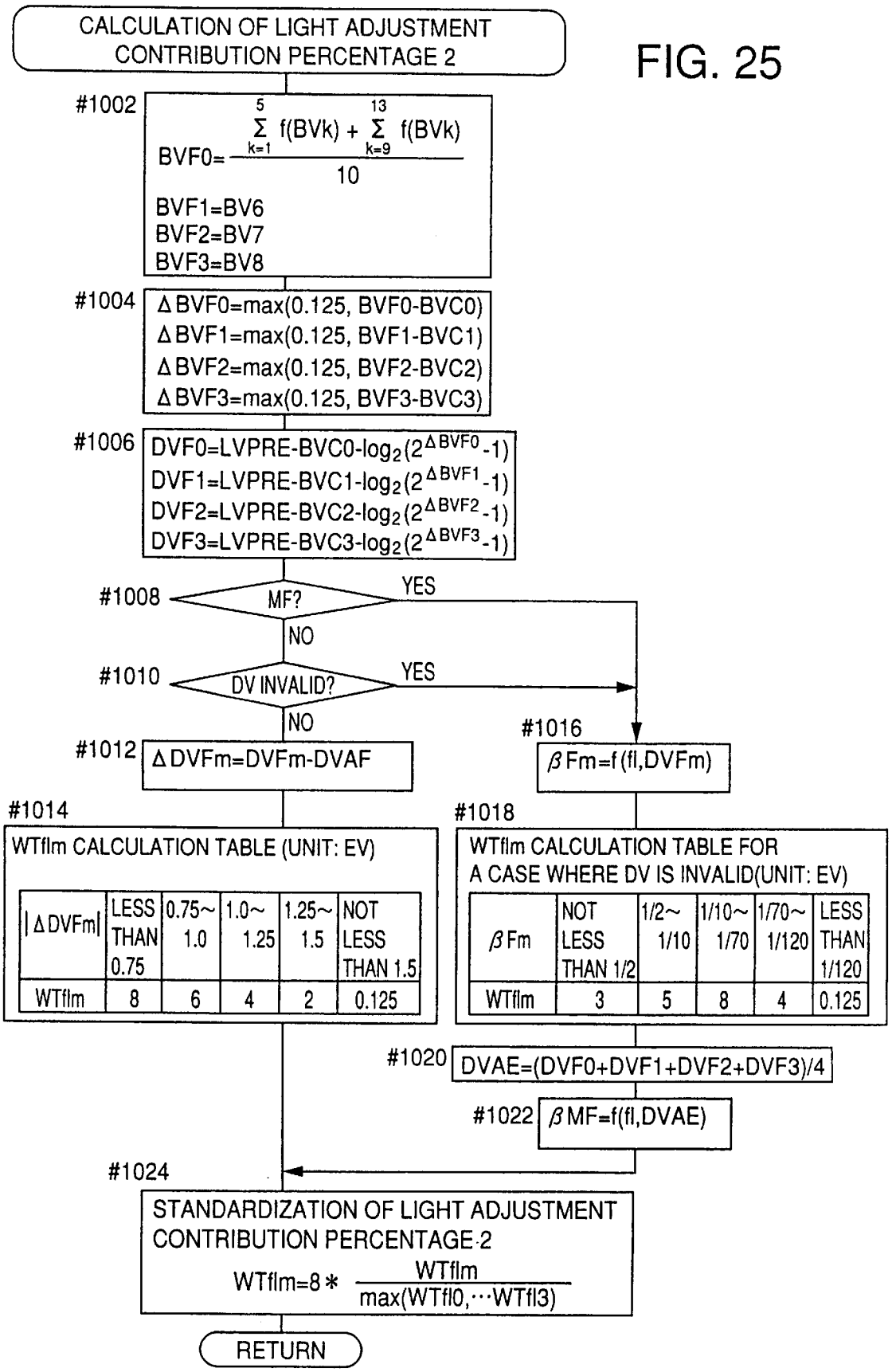
FIG. 25 is a flowchart showing the flow of the processing to calculate the contribution percentages of the light adjustment regions based on photometric information.

FIG. 25 shows the flow of the processing to calculate the light adjustment contribution percentage WTflm performed at #906 of FIG. 24. First, a brightness BVFm corresponding to each cell is calculated by use of the brightnesses BV0 to BV13 detected by the photometric element 22a at the time of preliminary light emission (#1002). The brightness BVFm is calculated in a similar manner to the brightness BVCm calculated at #302 of FIG. 15.

Then, a value obtained by subtracting the brightness BVCm in ambient light from the brightness BVFm in preliminary light emission is set as a preliminary light emission quantity ΔBVFm (#1004). When the value obtained by subtracting the brightness BVCm in ambient light from the brightness BVFm in preliminary light emission is equal to or less than 0.125, 0.125 is set as the preliminary light emission quantity ΔBVFm. Then, the preliminary light emission quantity ΔBVFm is converted into a detection distance DVFm (#1006). The detection distance DVFm is a value obtained by subtracting from a light emission intensity LVPRE in preliminary light emission the brightness BVCm in ambient light and a logarithm of a value obtained by subtracting 1 from the (ΔBVFm)-th power of 2 which logarithm is to the base 2. The detection distance DVFm may be calculated by use of a light emission guide number IVPRE in preliminary light emission (not shown).

Then, the contribution percentage WTflm is obtained (#1008 to #1022). In shooting under normal conditions, the contribution percentage WTflm is calculated based on the detection distance DVAF of the in-focus island and the detection distance DVFm which is a converted value of the preliminary light emission quantity. However, under specific conditions, the detection distance DVAF of the in-focus island is not used.

First, it is determined whether specific conditions apply or not (#1008, #1010). Specifically, the following determinations are made: whether manual focusing is set or not (#1008); and whether the detection distance DV is invalid or not (#1010).

This is for the following reasons: In manual focusing, there is no guarantee that the taking lens is focused on the subject and the reliability of the detection distance DVAF is low. When the detection distance DV is invalid, the detection distance DVAF is also invalid.

When the results of the determinations of #1008 and #1010 are false, first, a value obtained by subtracting the detection distance DVAF of the in-focus island from the detection distance DVFm which is a converted value of the preliminary light emission quantity is set as a detection distance difference ΔDVFm (#1012), and the contribution percentage WTflm of each light adjustment region m is calculated based on the absolute value |ΔDVFm| of the detection distance difference ΔDVFm (#1014). Here, the absolute value |ΔDVFm| is classified into five steps and the contribution percentage WTflm is set for each step.

Specifically, as the contribution percentage WTflm, 8 is set when the absolute value |ΔDVFm| is less than 0.75, 6 is set when the absolute value |ΔDVFm| is 0.75 to 1.0, 4 is set when the absolute value |ΔDVFm| is 1.0 to 1.25, 2 is set when the absolute value |ΔDVFm| is 1.25 to 1.5, and 0.125 is set when the absolute value |ΔDVFm| is equal to or greater than 1.5 (#1014).

When the result of either of the determinations of #1008 and #1010 is true, first, a reference value βFm obtained by performing a functional processing on the detection distance DVFm and the focal length fl is calculated (#1016). The function f(fl,DVFm) for processing the detection distance DVFm and the focal length fl is, for example, f(fl,DVFm)= fl/($2^{(DVFm/2)}$×1000).

Then, the contribution percentage WTflm of each light adjustment region m is calculated based on the reference value βFm (#1018). Here, the reference value βFm is classified into five steps and the light adjustment contribution percentage WTflm is set for each step.

Specifically, as the contribution percentage WTflm, 3 is set when the reference value βFm is equal to or greater than ½, 5 is set when the reference value βFm is ½ to ⅒, 8 is set when the reference value βFm is ⅒ to 1/70, 4 is set when the reference value βFm is 1/70 to 1/120, and 0.125 is set when the reference value βFm is less than 1/120 (#1018). Then, a parameter βMF used for a subsequently-described calculation of the light adjustment correction value ΔEVF is calculated (#1020, #1022).

First, a value obtained by dividing the sum of the detection distances DVFm of all the light adjustment regions by 4 is set as a detection distance DVAE (#1020). Then, a value obtained by performing a functional processing on the focal length fl and the detection distance DVAE is set as the parameter βMF (#1022). The function f(fl,DVAE) for processing the focal length fl and the detection distance DVAE is, for example, f(fl,DVAE)=fl/($2^{(DVAE/2)}$×1000).

Lastly, the contribution percentage WTflm of each light adjustment region m is standardized (#1024). The standardization is performed by dividing the contribution percentage WTflm of each light adjustment region m by the maximum value of the four contribution percentages WTfl0 to WTfl3, and multiplying the result by 8.

Figure 26:
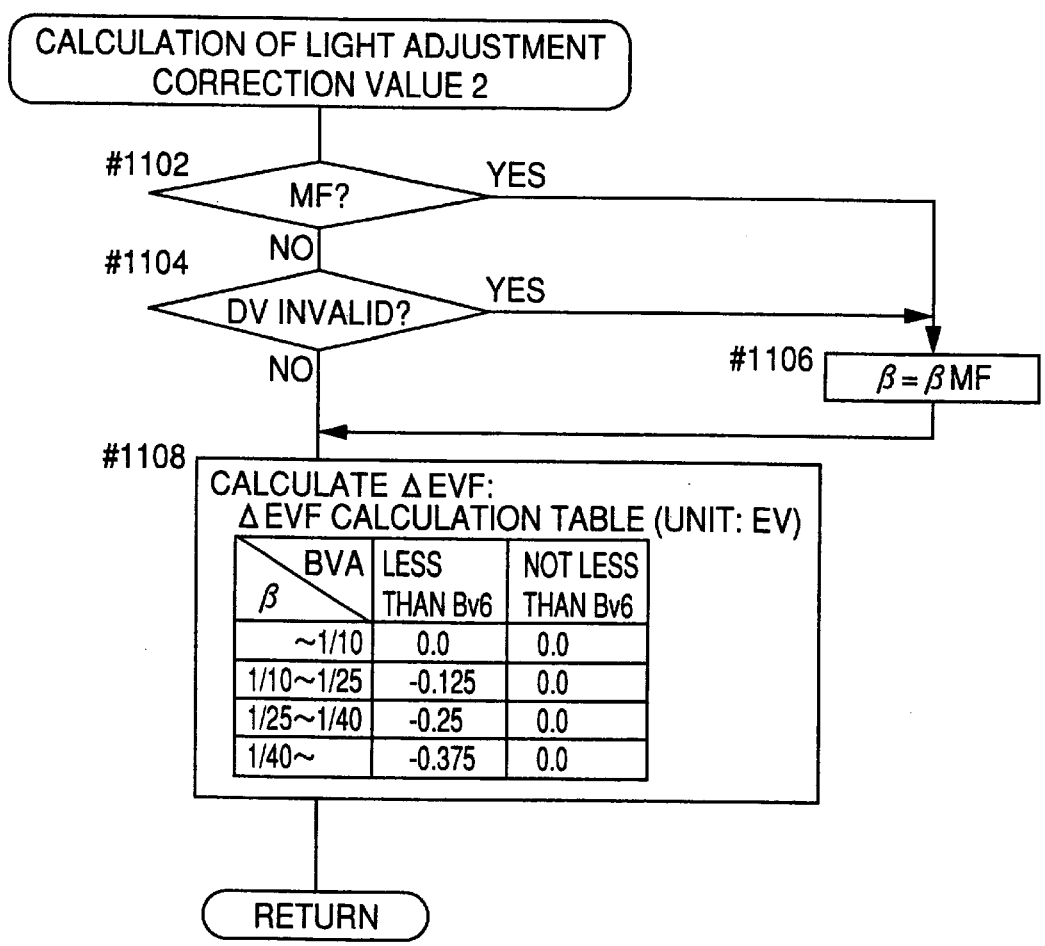
FIG. 26 is a flowchart showing the flow of the processing to calculate the light adjustment correction value based on the photometric information.

FIG. 26 shows the flow of the processing to calculate the light adjustment correction value ΔEVF performed at step #908 of FIG. 24. The correction value ΔEVF is expressed as an APEX value. In shooting under normal conditions, the light adjustment correction value ΔEVF is calculated based on the image magnification β and the background brightness BVA. However, under specific conditions, the image magnification β is replaced by the parameter βMF calculated at #1022 of FIG. 25, and based on this value and the background brightness BVA, the light adjustment correction value ΔEVF is calculated.

First, it is determined whether specific conditions apply or not (#1102, #1104). Specifically, the following determinations are made: whether manual focusing is set or not (#1102); and whether the detection distance DV is invalid or not (#1104).

This is for the following reasons: In manual focusing, there is no guarantee that the taking lens is focused on the subject and the reliability of the image magnification β is low. The reliability of the image magnification β is also low when the detection distance DV is not valid.

Using the value of the image magnification β as it is when the results of the determinations of #1102 and #1104 are false, or replacing the image magnification β by the parameter βMF when the result of either of the determinations of #1102 and #1104 is true (#1106), the light adjustment correction value ΔEVF is calculated based on the image magnification β and the background brightness BVA (#1108). Here, the image magnification β is classified into four steps and the background brightness BVA is classified into two steps. The light adjustment correction value ΔEVF is set for each step.

Specifically, when the background brightness BVA is equal to or greater than Bv6, 0.0 is set as the light adjustment correction value ΔEVF. When the background brightness BVA is less than Bv6 and the image magnification β is equal to or greater than ⅒, 0.0 is set, when the image magnification β is ⅒ to 1/25, −0.125 is set, when the image magnification β is 1/25 to 1/40, −0.2 is set, and when the image magnification β is less than 1/40, −0.375 is set as the light adjustment correction value ΔEVF (#1108).

Figure 27:
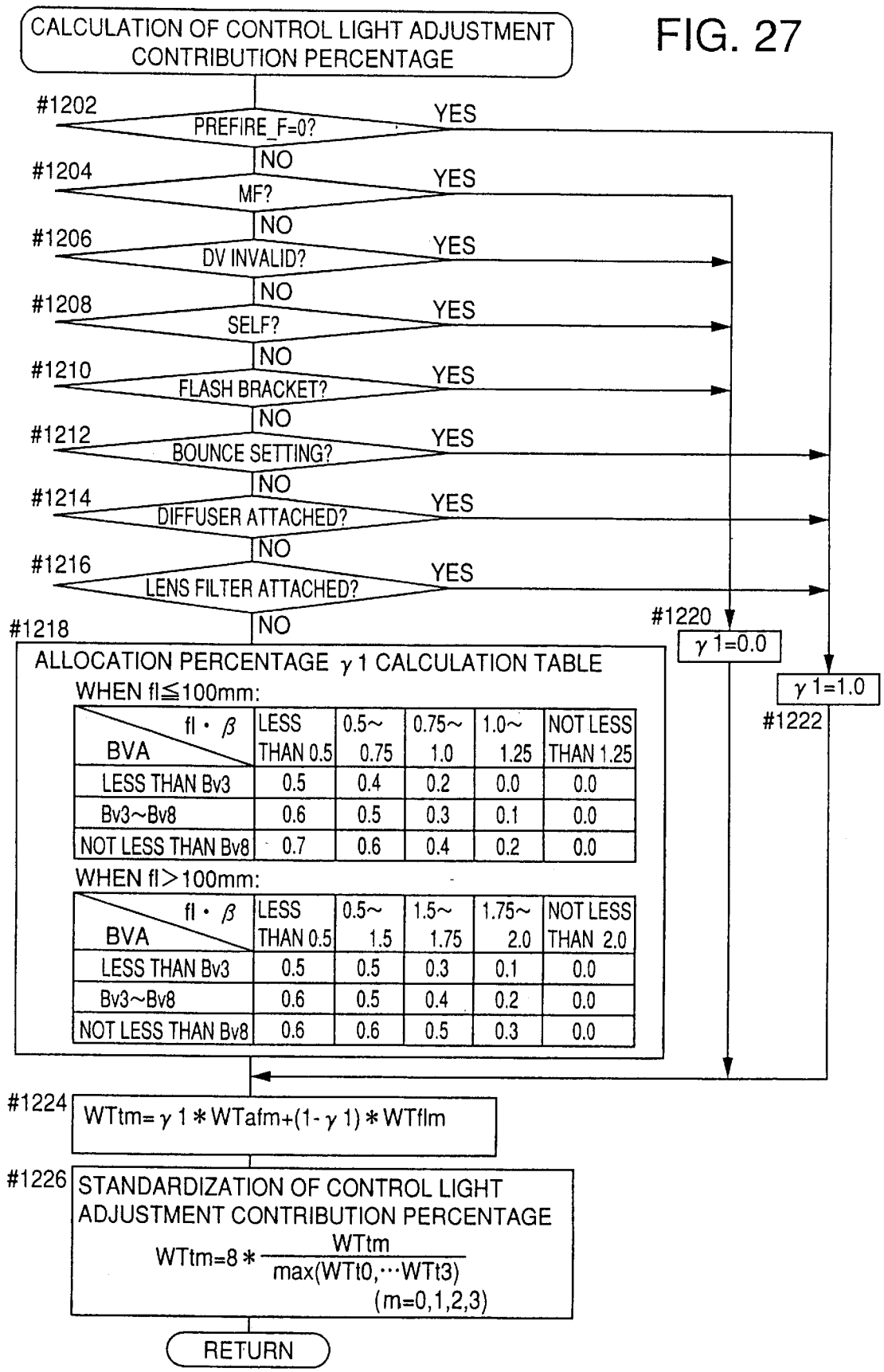
FIG. 27 is a flowchart showing the flow of the processing to calculate the contribution percentages of the light adjustment regions for control.

FIG. 27 shows the flow of the processing to calculate the control light adjustment contribution percentage WTtm performed at #914 of FIG. 24. In this processing, the allocation percentages of the contribution percentage WTafm and the contribution percentage WTflm used for calculating the control light adjustment contribution percentage WTtm are decided according to various pieces of shooting information, and the control light adjustment contribution percentage WTtm is calculated in accordance with the decided allocation percentages.

First, the value of the flag PREFIRE_F is checked to thereby determine whether preliminary light emission is performed or not (#1202). When the value of the flag PREFIRE_F is 0, since preliminary light emission is not performed, the contribution percentage WTflm based on preliminary light emission is not useful. Therefore, 1.0 is set as an allocation percentage γ1 so that the allocation percentage of the contribution percentage WTflm based on preliminary light emission is 0 (#1222).

Then, the following determinations are made: whether manual focusing is set or not (#1204); whether the DV value is invalid or not (#1206); self timer shooting is set or not (#1208); and whether flash bracket shooting is set or not (#1210). When the result of any one of these determinations is true, since the reliability of the contribution percentage WTafm based on distance measurement information is low, 0 is set as the allocation percentage γ1 so that the allocation percentage of the contribution percentage WTafm based on distance measurement information is 0.0 (#1220).

When the results of all the determinations of #1204 to #1210 are false, the following determinations are made: whether bounce setting is made or not (#1212); whether a diffuser is attached or not (#1214); and whether a lens filter is attached or not (#1216). When the result of any one of the determinations of #1212 to #1216 is true, 1.0 is set as the allocation percentage γ1 so that the allocation percentage of the contribution percentage WTflm based on preliminary light emission is 0 (#1222).

When the results of all the determinations of #1212 to #1216 are false, the value of the allocation percentage γ1 is calculated based on the focal length fl, a value fl×β obtained by multiplying the focal length fl by the image magnification β, and the background brightness BVA (#1218). Here, the focal length fl is classified into two steps of not more than 100 mm and more than 100 mm. First, the case in which the focal length fl is equal to or less than 100 mm will be described. In this case, the value β×fl is classified into five steps of less than 0.5, 0.5 to 0.75, 0.75 to 1.0, 1.0 to 1.25 and not less than 1.25 and the background brightness BVA is classified into three steps of less than Bv value 3, 3 to 8 and not less than 8. The allocation percentage γ1 is set for each step.

Specifically, when the value fl×β is equal to or greater than 1.25, the allocation percentage γ1 is set to 0.0 irrespective of the background brightness BVA. When the value fl×β is 1.0 to 1.25, the allocation percentage γ1 is changed from 0.0 to 0.2 in steps of 0.1 as the background brightness BVA increases. When the value fl×β is 0.75 to 1.0, the allocation percentage γ1 is changed from 0.2 to 0.4 in steps of 0.1 as the background brightness BVA increases. When the value fl×β is 0.5 to 0.75, the allocation percentage γ1 is changed from 0.4 to 0.6 in steps of 0.1 as the background brightness BVA increases. When the value fl×β is less than 0.5, the allocation percentage γ1 is changed from 0.5 to 0.7 in steps of 0.1 as the background brightness BVA increases.

The case in which the focal length is more than 100 mm will be described. In this case, the value β×fl is classified into five steps of less than 0.5, 0.5 to 1.5, 1.5 to 1.75, 1.75 to 2.0 and not less than 2.0 and the background brightness BVA is classified into three steps of less than Bv value 3, 3 to 8 and not less than 8. The allocation percentage γ1 is set for each step.

Specifically, when the value fl×β is equal to or greater than 2.0, the allocation percentage γ1 is set to 0.0 irrespective of the background brightness BVA. When the value fl×β is 1.75 to 2.0, the allocation percentage γ1 is changed from 0.1 to 0.3 in steps of 0.1 as the background brightness BVA increases. When the value fl×β is 1.5 to 1.75, the allocation percentage γ1 is changed from 0.3 to 0.5 in steps of 0.1 as the background brightness BVA increases. When the value fl×β is 0.5 to 1.5, the allocation percentage γ1 is set to 0.5, 0.5 and 0.6 as the background brightness BVA increases. When the value fl×β is less than 0.5, the allocation percentage γ1 is set to 0.5, 0.6 and 0.6 as the background brightness BVA increases.

After the allocation percentage γ1 is decided at any of #1218, #1220 and #1222 in accordance with shooting information, the sum of a value obtained by multiplying the contribution percentage WTafm based on distance measurement information by the allocation percentage γ1 and a value obtained by multiplying the contribution percentage WTflm based on preliminary light emission by an allocation percentage (1−γ1) is calculated as the control light adjustment contribution percentage WTtm (#1224).

Lastly, the contribution percentage WTtm of each light adjustment region m is standardized (#1226). The standardization is performed by dividing the contribution percentage WTtm of each light adjustment region m by the maximum value of the four contribution percentages WTt0 to WTt3, and multiplying the result by 8.

Figure 28:
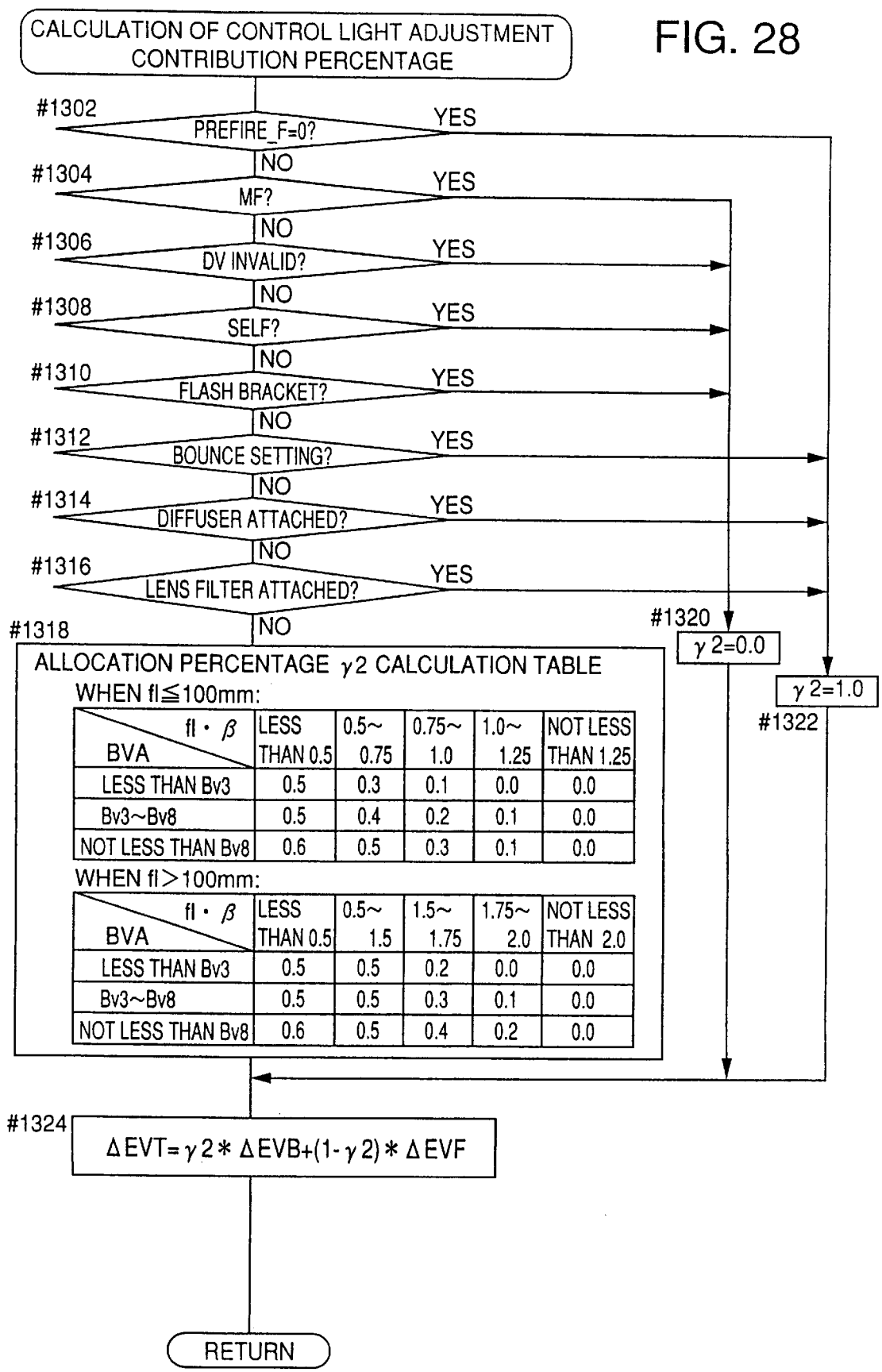
FIG. 28 is a flowchart showing the flow of the processing to calculate a control light adjustment correction value.

FIG. 28 shows the flow of the processing to calculate the control light adjustment correction value ΔEVT performed at #916 of FIG. 24. In this processing, the allocation percentages of the correction value ΔEVB and the correction value ΔEVF used for calculating the control light adjustment correction value ΔEVT are decided in accordance with various pieces of shooting information, and the control light adjustment correction value ΔEVT is calculated in accordance with the decided allocation percentages.

The determinations of #1302 to #1316 performed for obtaining various pieces of shooting information will not be described because they are the same as the determinations of #1202 to #1216 of FIG. 27. When an allocation percentage γ2 is set at #1322 as the result of the determinations, by setting 1.0 as the allocation percentage γ2 which is the allocation percentage of the correction value ΔEVB based on distance measurement information, the correction value ΔEVF based on preliminary light emission is not added.

When the allocation percentage γ2 is set at #1320 as the results of the determinations, by setting 0.0 to the allocation percentage γ2 which is the allocation percentage of the correction value ΔEVB based on distance measurement information, the correction value ΔEVB based on distance measurement information is not added.

A case will be described in which the allocation percentage γ2 is decided at #1318 as the results of the determinations. In this case, the value of the allocation percentage γ2 is calculated based on the focal length fl, the value fl×β obtained by multiplying the focal length fl by the image magnification β and the background brightness BVA. The focal length fl is classified into two steps of not more than 100 mm and more than 100 mm. First, the case in which the focal length fl is equal to or less than 100 mm will be described. In this case, the value β×fl is classified into five steps of less than 0.5, 0.5 to 0.75, 0.75 to 1.0, 1.0 to 1.25 and not less than 1.25 and the background brightness BVA is classified into three steps of less than Bv value 3, 3 to 8 and not less than 8. The allocation percentage γ2 is set for each step.

Specifically, when the value fl×β is equal to or greater than 1.25, the allocation percentage γ2 is set to 0.0 irrespective of the background brightness BVA. When the value flxy is 1.0 to 1.25, the allocation percentage γ2 is set to 0.0, 0.1 and 0.1 as the background brightness BVA increases. When the value fl×β is 0.75 to 1.0, the allocation percentage γ2 is changed from 0.1 to 0.3 in steps of 0.1 as the background brightness BVA increases. When the value fl×β is 0.5 to 0.75, the allocation percentage γ2 is changed from 0.3 to 0.5 in steps of 0.1 as the background brightness BVA increases. When the value fl×β is less than 0.5, the allocation percentage γ2 is set to 0.5, 0.5 and 0.6 as the background brightness BVA increases.

The case in which the focal length fl is more than 100 mm will be described. In this case, the value β×fl is classified into five steps of less than 0.5, 0.5 to 1.5, 1.5 to 1.75, 1.75 to 2.0 and not less than 2.0 and the background brightness BVA is classified into three steps of less than Bv value 3, 3 to 8 and not less than 8. The allocation percentage γ2 is set for each step.

Specifically, when the value fl×β is equal to or greater than 2.0, the allocation percentage γ2 is set to 0.0 irrespective of the background brightness BVA. When the value fl×β is 1.75 to 2.0, the allocation percentage γ2 is changed from 0.0 to 0.2 in steps of 0.1 as the background brightness BVA increases. When the value fl×β is 1.5 to 1.75, the allocation percentage γ2 is changed from 0.2 to 0.4 in steps of 0.1 as the background brightness BVA increases. When the value fl×β is 0.5 to 1.5, the allocation percentage γ2 is set to 0.5 irrespective of the background brightness BVA. When the value fl×β is less than 0.5, the allocation percentage is set to 0.5, 0.5 and 0.6 as the background brightness BVA increases.

After the allocation percentage γ2 is decided at any of #1318, #1320 and #1322 in accordance with shooting information, the sum of a value obtained by multiplying the correction value ΔEVB based on distance measurement information by the allocation percentage γ2 and a value obtained by multiplying the correction value ΔEVF based on preliminary light emission by an allocation percentage (1−γ2) is calculated as the control light adjustment correction value ΔEVT (#1324).

As described above, the camera of this embodiment is provided with a light adjustment system having a plurality of distance measurement regions and deciding the light emission quantity control value for flash shooting in accordance with the distance measurement information from the distance measurement regions. When auxiliary light is emitted, the light adjustment system includes distance measurement information in auxiliary light emission as the distance measurement information.

Figure 29:
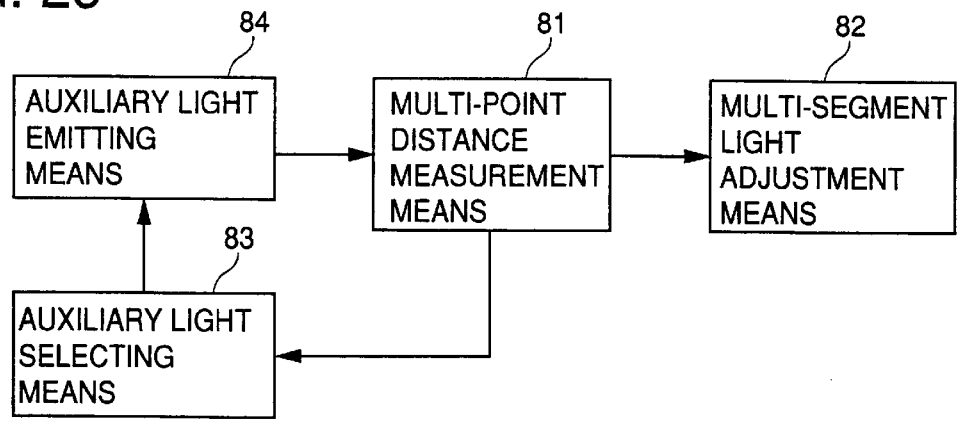
FIG. 29 is a block diagram showing a structure where the above-described functions of the camera is viewed from a standpoint.

A camera structure viewed from this standpoint is shown in the block diagram of FIG. 29. The camera of this embodiment has a flash controller comprising: multi-point distance measurement means 81 having a plurality of distance measurement regions and for outputting distance measurement information of each distance measurement region; multi-segment light adjustment means 82 having a plurality of light adjustment regions including regions substantially coinciding with the distance measurement regions, and for deciding the light emission quantity control value in accordance with the distance measurement information; auxiliary light selecting means 83 for selecting whether to emit auxiliary light to the distance measurement regions or not; and auxiliary light emitting means 84 for emitting auxiliary light to at least two distance measurement regions when the emission of auxiliary light is selected by the auxiliary light selecting means 83. When auxiliary light is emitted by the auxiliary light emitting means 84, the flash controller includes, as the distance measurement information, in auxiliary light emission, of the distance measurement regions to which auxiliary light is emitted.

With this structure, the accuracy of the distance measurement information of the distance measurement regions can be improved by emitting auxiliary light. Consequently, the light emission quantity in flash shooting can be decided with higher accuracy.

The auxiliary light selecting means 83 of the camera of this embodiment selects the emission of auxiliary light when low contrast is detected in at least one region in the distance measurement information of the distance measurement regions of the multi-point distance measurement means.

Consequently, the distance measurement accuracy under low contrast can be improved, so that the light emission quantity in flash shooting can be decided with higher accuracy. When no low-contrast region is detected, the power consumption can be minimized by not selecting the emission of auxiliary light.

Moreover, the camera of this embodiment has release starting means for outputting a release start signal to provide an instruction to start release by the user's operation, and release control means for starting the release operation in response to the release start signal and controlling the light emission quantity in the release operation in accordance with the light emission quantity control value decided by the multi-segment light adjustment means 82.

With this structure, the distance measurement accuracy can be improved by emitting auxiliary light before the release operation, so that the flash light emission quantity can be decided with higher accuracy.

Figure 30:
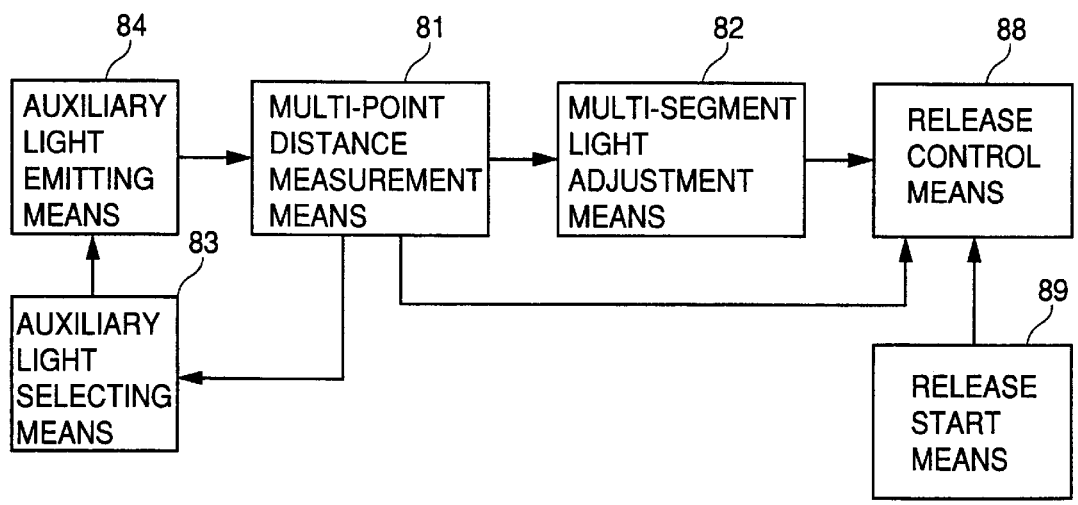
FIG. 30 is a block diagram showing a structure where the above-described functions of the camera is viewed from another standpoint.

A camera structure viewed from this standpoint is shown in the block diagram of FIG. 30. The structure of this block diagram is different from the structure of the block diagram of FIG. 29 in that release control means 88 and release start means 89 are present. In a control method of the release control means 88, when low contrast is detected in at least one region in the distance measurement information of the distance measurement regions of the multi-point distance measurement means 81, the release operation is inhibited until the calculation of distance measurement information in auxiliary light emission at the multi-point distance measurement means 81 is completed (corresponding to step #34 of FIG. 10). In this case, the release control means 88 determines whether to start the release operation or not in accordance with the release start signal outputted from the release start means 89 and the distance measurement information outputted from the multi-point distance measurement information. That is, when low contrast is detected in at least one region, the release operation is started only when the release start signal is outputted and the calculation of the distance measurement information in auxiliary light emission at the multi-point distance measurement means 81 is completed.

With this structure, when low contrast is detected in at least one region, the distance measurement information in auxiliary light emission is always included as the distance measurement information for controlling light emission, so that light emission in flash shooting is made in a more appropriate light emission quantity.

In a different control method of the release control means 88, when low contrast is detected in at least one region in the distance measurement information of the distance measurement regions of the multi-point distance measurement means 81, control is performed in the following manner: When the release operation is started before the calculation of the distance measurement information in auxiliary light emission is completed, emitted light is controlled by use of a light emission quantity calculated in accordance with distance measurement information not including the distance measurement information in auxiliary light emission. When the release operation is started after the calculation of the distance measurement information for auxiliary light emission is completed, emitted flash light is controlled by use of a light emission quantity calculated in accordance with distance measurement information including the distance measurement information in auxiliary light emission.

According to this control method, even when the release operation is performed under a condition where the distance measurement information in auxiliary light emission is not decided like in the release priority mode, flash shooting can be performed without the light adjustment level being significantly changed.

Moreover, in the camera of this embodiment, the final control light adjustment correction value ΔEVT is calculated based on the light adjustment correction value ΔEVB calculated in accordance with multi-point distance measurement information, the light adjustment correction value ΔEVF calculated in accordance with photometric information in preliminary light emission and the allocation percentage γ2 calculated in accordance with information different from the multi-point distance measurement information and the photometric information in preliminary light emission, and the real light emission control in flash shooting is performed with the finally obtained control light adjustment correction value ΔEVT.

Figure 31:
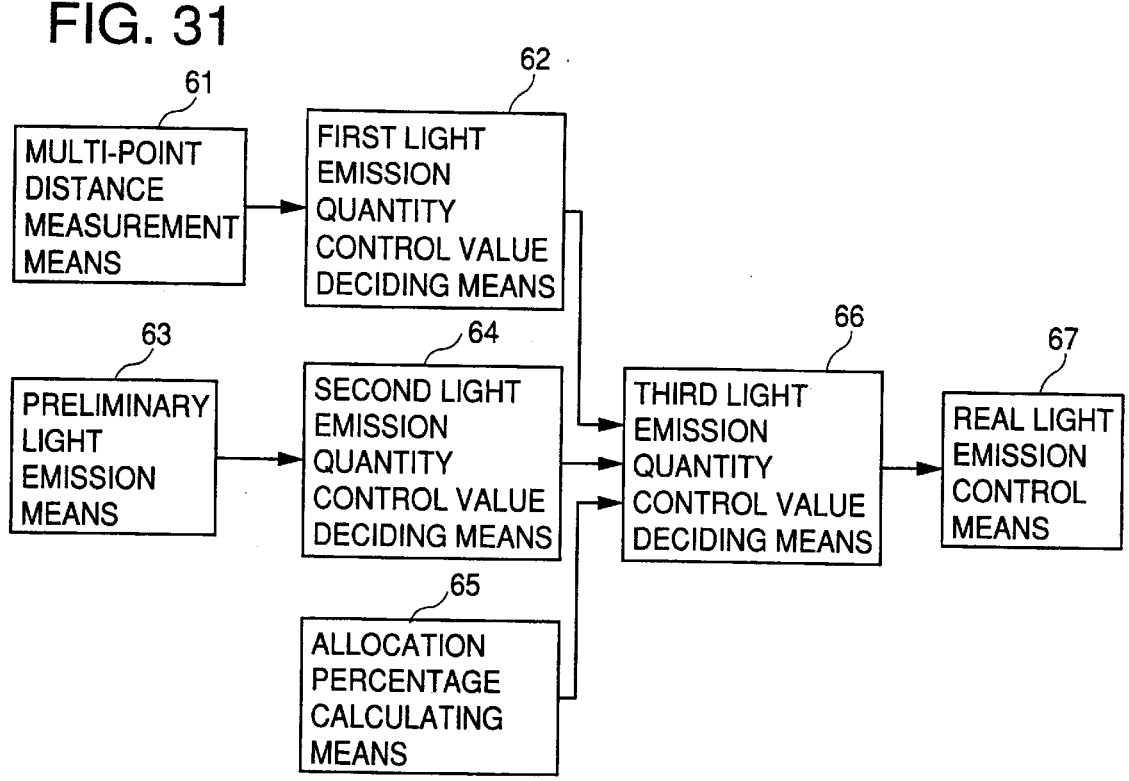
FIG. 31 is a block diagram showing a structure where the above-described functions of the camera is viewed from another standpoint.

A camera structure viewed from this standpoint is shown in the block diagram of FIG. 31. This camera comprises: multi-point distance measurement means 61 having a plurality of distance measurement regions and for outputting distance measurement information of the distance measurement regions; first light emission quantity control value deciding means 62 for deciding a first light emission quantity control value (light adjustment correction value ΔEVB) in accordance with the distance measurement information (the processing of FIG. 23); preliminary light emission means 63 having a plurality of photometric regions and for performing preliminary light emission prior to the real light emission shooting and performing photometry of the reflected light from the direction of the subject to output photometric information in preliminary light emission; second light emission quantity control value deciding means 64 for deciding a second light emission quantity control value (light adjustment correction value ΔEVF) in accordance with the photometric information (the processing of FIG. 26); allocation percentage calculating means 65 for deciding allocation percentages (allocation percentages γ2) of the first and the second light emission quantity control values based on shooting information different from the distance measurement information and the photometric information (the processing at steps #1302 to #1322 of FIG. 28); third light emission quantity control value deciding means 66 for deciding a third light emission quantity control value (control light adjustment correction value ΔEVT) based on the first light emission quantity control value, the second light emission quantity control value and the allocation percentage (the processing at step #1324 of FIG. 28); and real light emission control means 67 for performing control of emitted light in real light emission in accordance with the third light emission quantity control value.

That is, a more appropriate ratio between the light adjustment correction value ΔEVB calculated in accordance with multi-point distance measurement information and the light adjustment correction value ΔEVF calculated in accordance with photometric information in preliminary light emission is selected in accordance with various shooting conditions such as the focal length fl, the image magnification β and the AF mode information to thereby decide the final control light adjustment correction value ΔEVT. With this structure, for example, even when one of the multi-point distance measurement information and the photometric information in preliminary light emission is invalid, the invalidness can be complemented by the other information, so that appropriate light adjustment control suitable for various shooting conditions can be performed.

Moreover, in the camera of this embodiment, the final control light adjustment contribution percentage WTtm is calculated based on the light adjustment contribution percentage WTafm of the light adjustment regions m calculated in accordance with multi-point distance measurement information, the light adjustment contribution percentage WTflm of the light adjustment regions m calculated in accordance with photometric information in preliminary light emission and the allocation percentage γ1 calculated based on information different from the multi-point distance measurement information and the photometric information in preliminary light emission, and the real light emission in flash shooting is performed with the finally obtained control light adjustment contribution percentages WTtm of the light adjustment regions m.

Figure 32:
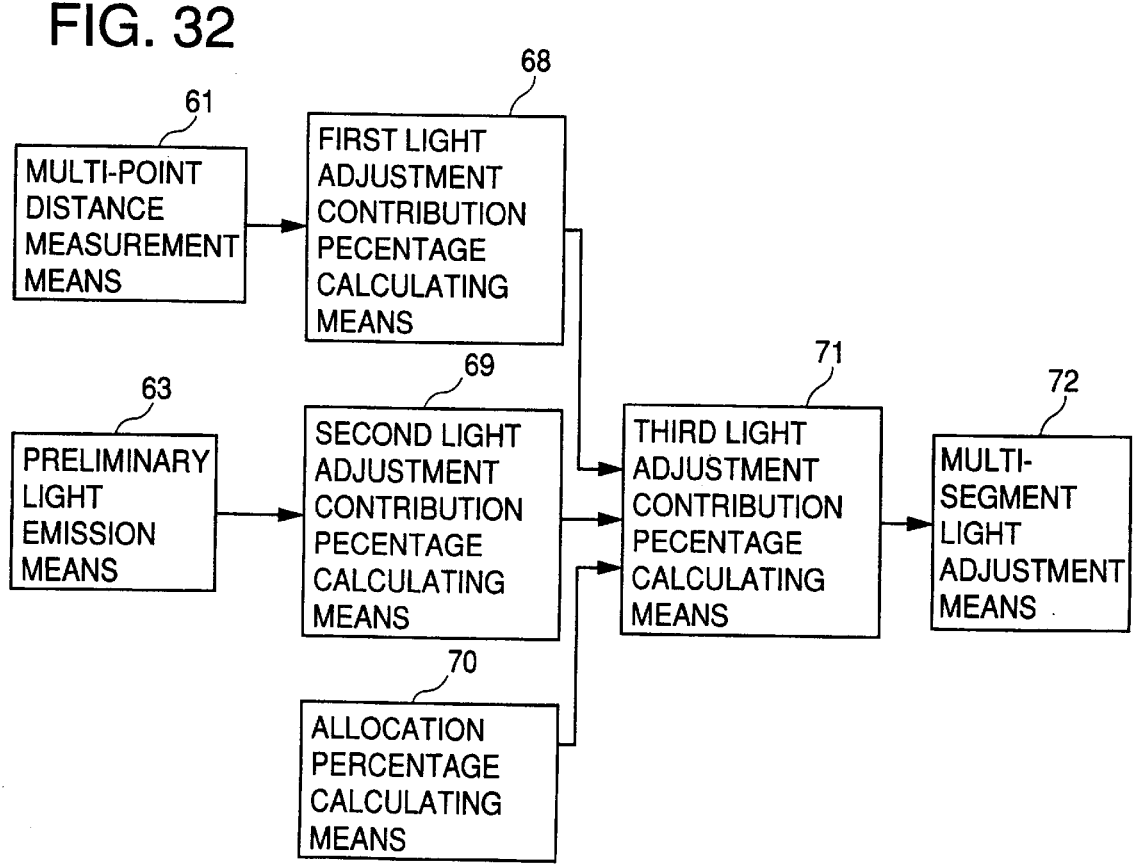
FIG. 32 is a block diagram showing a structure where the above-described functions of the camera is viewed from another standpoint.

A camera structure viewed from this standpoint is shown in the block diagram of FIG. 32. This camera comprises: multi-point distance measurement means 61 having a plurality of distance measurement regions and for outputting distance measurement information of the distance measurement regions; multi-segment light adjustment means 72 having a plurality of light adjustment regions including regions substantially coinciding with the distance measurement regions and for performing light adjustment control of emitted light in real light emission in accordance with the light adjustment contribution percentage obtained for each light adjustment region; first light adjustment contribution percentage calculating means 68 for calculating a first light adjustment contribution percentage (contribution percentage WTafm) of each light adjustment region in accordance with the distance measurement information (the processings of FIGS. 21 and 22); preliminary light emission means 63 having a plurality of photometric regions and for performing preliminary light emission prior to the real light emission shooting and performing photometry of the light reflected from the direction of the subject to output photometric information in preliminary light emission; second light adjustment contribution percentage calculating means 69 for calculating a second light adjustment contribution percentage (contribution percentage WTflm) of each light adjustment region in accordance with the photometric information (the processing of FIG. 25); allocation percentage calculating means 70 for deciding allocation percentages (allocation percentages γ1) of the first and the second light adjustment contribution percentages based on shooting information different from the distance measurement information and the photometric information (the processing at steps #1202 to #1222 of FIG. 27); and third light adjustment contribution percentage calculating means 71 for deciding a third light adjustment contribution percentage based on the first light adjustment contribution percentage, the second light adjustment contribution percentage and the allocation percentage (the processing at step #1224 of FIG. 27). The multi-segment light adjustment means 72 performs light adjustment control of emitted light in real light emission shooting with the third light adjustment contribution percentage.

That is, a more appropriate ratio between the light adjustment contribution percentage WTafm of each light adjustment region m calculated in accordance with multi-point distance measurement information and the light adjustment contribution percentage WTflm of each light adjustment region m calculated in accordance with photometric information in preliminary light emission is selected in accordance with various shooting conditions such as the focal length fl, the image magnification β and the AF mode information to thereby decide the final control light adjustment contribution percentage WTtm. With this structure, for example, even when one of the multi-point distance measurement information and the photometric information in preliminary light emission is invalid, the invalidness can be complemented by the other information, so that appropriate light adjustment control in accordance with various shooting conditions can be performed.

The allocation percentage calculating means 65 and 70 of the camera of this embodiment calculate the allocation percentages based on information including the focal length fl. Consequently, the inaccuracy of the preliminary light emission information on the wide-angle side can be complemented by distance measurement information.

Moreover, the allocation percentage calculating means 65 and 70 of the camera of this embodiment calculate the allocation percentages based on information including the image magnification β. Consequently, the inaccuracy of the distance measurement information obtained by distance measurement when the image magnification β is low can be complemented by preliminary light emission information.

Moreover, the allocation percentage calculating means 65 and 70 of the camera of this embodiment calculate the allocation percentages based on information including brightness information. Consequently, the inaccuracy of the distance measurement information when the background brightness is low can be complemented by preliminary light emission.

Moreover, the allocation percentage calculating means 65 and 70 of the camera of this embodiment calculate the allocation percentages based on information including AF mode information. Consequently, in manual focusing where distance measurement information cannot be obtained, by deciding the final light emission quantity control value or the light adjustment contribution percentage of each light adjustment region based mainly on preliminary light emission information, more excellent light adjustment control can be performed.

Moreover, the allocation percentage calculating means 65 and 70 of the camera of this embodiment calculate the allocation percentages based on information including information on whether preliminary light emission is performed or not. Consequently, when preliminary light emission is not performed, by deciding the final light emission quantity control value or the light adjustment contribution percentage of each light adjustment region based only on distance measurement information, excellent light adjustment control can be performed.

Moreover, the allocation percentage calculating means 65 and 70 of this embodiment calculate the allocation percentages based on information on whether the self timer shooting mode is set or not, information on whether flash bracket shooting is set or not, information on flash bounce shooting is set or not, information on whether a diffuser is attached or not and information on whether a lens filter is attached or not. Consequently, for example, by deciding the final light emission quantity control value or the light adjustment contribution value of each light adjustment region based mainly on photometric information in preliminary light emission when the self timer shooting mode is set and when flash bracket shooting is set and based mainly on distance measurement information when flash bounce shooting is set, when a diffuser is attached and when a lens filter is attached, more excellent light adjustment control can be performed.

Obviously, many modifications and variations of the present invention are possible in light of the above teachings. It is therefore to be understood that within the scope of the appended claims, the invention may be practiced other than as specifically described.

What is claimed is:

1. A flash control apparatus comprising:
   a distance measurement device having a plurality of distance measurement regions, said distance measurement device outputting distance measurement information of each distance measurement region;
   a light adjustment device having a plurality of light adjustment regions including regions substantially coinciding with the distance measurement regions;
   an auxiliary light emitting device for emitting auxiliary light at the time of distance measurement performed at least after a taking lens becomes in focus on an object;
   a controller for controlling a flash light emission quantity based on distance measurement information in auxiliary light emission, and an output from said light adjustment device.

2. A flash control apparatus as claimed in claim 1, wherein said auxiliary light emitting device emits auxiliary light when low contrast is detected in at least one of said plurality of distance measurement regions.

3. A flash control apparatus as claimed in claim 1, wherein said controller decides a contribution percentage of the output from said light adjustment device based on the distance measurement information in auxiliary light emission.

4. A flash control apparatus as claimed in claim 1, wherein said flash control apparatus is a camera.

5. A flash control apparatus as claimed in claim 4, wherein said camera further comprises a member for providing an instruction to start exposure, and said controller controls a flash light emission quantity in an exposure operation.

6. A flash control apparatus as claimed in claim 5, wherein said camera inhibits the exposure operation until calculation of the distance measurement information in auxiliary light emission is completed.

7. A flash control apparatus as claimed in claim 5, wherein when the instruction to start exposure is provided before calculation of the distance measurement information in auxiliary light emission is completed, said controller controls the flash light emission quantity based on distance measurement information not including the distance measurement information in auxiliary light emission.

8. A method of controlling a flash apparatus for illuminating a subject, comprising the steps of:
   emitting auxiliary light after a taking lens becomes in focus on an object;
   calculating distance measurement information of a plurality of regions irradiated with the auxiliary light;
   deciding a control value of flash light based on the calculated distance measurement information;
   emitting said flash light; and
   controlling an emission quantity of said flash light based on the decided control value.

9. A camera controlling a flash apparatus for illuminating a subject, comprising:
   a distance measurement device for outputting distance measurement information to a subject;
   a first calculator for calculating a first light emission quantity control value of said flash apparatus based on said distance measurement information;
   a first controller for performing preliminary light emission with said flash apparatus;
   a photometric device for performing photometry of light reflected from the subject in said preliminary light emission and outputting photometric information;
   a second calculator for calculating a second light emission quantity control value of said flash apparatus based on said photometric information;
   a third calculator for deciding allocation percentages of said first light emission quantity control value and the second light emission quantity control value;
   a fourth calculator for calculating a third light emission quantity control value of said flash apparatus based on said first light emission quantity control value, said second light emission quantity control value and said allocation percentages; and
   a second controller for controlling emitted light in real light emission by said flash apparatus based on said third light emission quantity control value.

10. A camera as claimed in claim 9, wherein said third calculator decides the allocation percentages based on shooting information different from said distance measurement information and said photometric information.

11. A camera as claimed in claim 10, wherein said shooting information includes information on a focal length of a taking lens.

12. A camera as claimed in claim 10, wherein said shooting information is information on a shooting mode.

13. A camera as claimed in claim 10, wherein said shooting information is brightness information.

14. A camera as claimed in claim 9, wherein said distance measurement device and said photometric device output distance measurement information and photometric information of a plurality of regions, respectively.

15. A method of controlling a flash apparatus for illuminating a subject, comprising the steps of:
   outputting distance measurement information to a subject;
   calculating a first light emission quantity control value of said flash apparatus based on said distance measurement information;
   performing preliminary light emission with said flash apparatus;

performing photometry of light reflected from the subject in said preliminary light emission and outputting photometric information;

calculating a second light emission quantity control value of said flash apparatus based on said photometric information;

deciding allocation percentages of said first light emission quantity control value and said second light emission quantity control value;

calculating a third light emission quantity control value of said flash apparatus based on said first light emission quantity control value, said second light emission quantity control value and said allocation percentages; and controlling emitted light in real light emission by said flash apparatus based on said third light emission quantity control value.

16. A camera controlling a flash apparatus for illuminating a subject, comprising:

a distance measurement device for outputting distance measurement information to a subject;

a light adjustment device having a plurality of light adjustment regions;

a first calculator for calculating, based on said distance measurement information, a first contribution percentage of said light adjustment device corresponding to each of said light adjustment regions;

a first controller for performing preliminary light emission with said flash apparatus;

a photometric device having a plurality of photometric regions, said photometric device performing photometry of light reflected from the subject in said preliminary light emission and outputting photometric information;

a second calculator for calculating, based on said photometric information, a second contribution percentage of said light adjustment device corresponding to each of said light adjustment regions;

a third calculator for deciding allocation percentages of said first contribution percentage and said second contribution percentage;

a fourth calculator for calculating a third contribution percentage based on said first contribution percentage, said second contribution percentage and said allocation percentages; and a second controller for controlling emitted light in real light emission by said flash apparatus based on said third contribution percentage.

17. A camera as claimed in claim 16, wherein said third calculator decides the allocation percentages based on shooting information different from said distance measurement information and said photometric information.

18. A camera as claimed in claim 17, wherein said shooting information includes information on a focal length of a taking lens.

19. A camera as claimed in claim 17, wherein said shooting information is information on a shooting mode.

20. A camera as claimed in claim 17, wherein said shooting information is brightness information.

21. A camera as claimed in claim 16, wherein said distance measurement device outputs distance measurement information of a plurality of regions, and said light adjustment device have a plurality of light adjustment regions including regions substantially coinciding with said plurality of distance measurement regions.

22. A method of controlling a flash apparatus for illuminating a subject, comprising the steps of:

outputting distance measurement information to a subject;

calculating a first contribution percentage for outputs from a plurality of light adjustment devices based on said distance measurement information;

performing preliminary light emission with said flash apparatus;

performing photometry of light reflected from a subject in said preliminary light emission and outputting photometric information corresponding to a plurality of photometric regions;

calculating a second contribution percentage for the outputs of said plurality of light adjustment devices based on said photometric information;

deciding allocation percentages of said first contribution percentage and said second contribution percentage;

calculating a third contribution percentage based on said first contribution percentage, said second contribution percentage and said allocation percentages; and controlling emitted light in real light emission by said flash apparatus based on said third contribution percentage.

* * * * *